United States Patent
Fasola et al.

(10) Patent No.: US 12,227,208 B2
(45) Date of Patent: Feb. 18, 2025

(54) COLLISION IMMINENT DETECTION

(71) Applicant: GM Cruise Holdings LLC, San Francisco, CA (US)

(72) Inventors: Juan Fasola, San Francisco, CA (US); Eugene Lo, Redwood City, CA (US); Xiaoyu Zhou, San Francisco, CA (US); Shreyans Kushwaha, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 303 days.

(21) Appl. No.: 17/841,382

(22) Filed: Jun. 15, 2022

(65) Prior Publication Data

US 2023/0406359 A1  Dec. 21, 2023

(51) Int. Cl.
*B60W 60/00* (2020.01)
*B60W 30/09* (2012.01)
*B60W 50/023* (2012.01)
*G06N 5/01* (2023.01)

(52) U.S. Cl.
CPC ........ *B60W 60/0027* (2020.02); *B60W 30/09* (2013.01); *B60W 50/023* (2013.01); *G06N 5/01* (2023.01); *B60W 2554/4044* (2020.02); *B60W 2555/60* (2020.02)

(58) Field of Classification Search
None
See application file for complete search history.

(56) References Cited

U.S. PATENT DOCUMENTS

| | | | |
|---|---|---|---|
| 2014/0297171 A1* | 10/2014 | Minemura | B60R 21/34 342/70 |
| 2018/0126984 A1 | 5/2018 | Liu et al. | |
| 2019/0367022 A1 | 12/2019 | Zhao et al. | |
| 2020/0148201 A1 | 5/2020 | King et al. | |
| 2020/0327807 A1* | 10/2020 | Kamrani | G07C 5/085 |
| 2021/0056712 A1* | 2/2021 | Daudelin | G06V 20/58 |
| 2021/0103285 A1* | 4/2021 | Philbin | G01S 15/931 |
| 2023/0030815 A1* | 2/2023 | Happold | B60W 60/001 |

FOREIGN PATENT DOCUMENTS

WO  2021067445 A1  4/2021

* cited by examiner

*Primary Examiner* — Tuan C To
*Assistant Examiner* — David Ruben Pedersen
(74) *Attorney, Agent, or Firm* — Dimitri Kirimis

(57) ABSTRACT

Systems and methods for collision imminent detection are provided. A method includes collecting sensor data generated by one or more sensors of a vehicle; detecting, by a fallback control system of the vehicle based on the sensor data, an imminent collision between the vehicle and an object in an environment of the vehicle using a first process different from a second process of a primary control system of the vehicle, wherein the first process and the second process are associated with at least one of a perception or a prediction; and transmitting, by the fallback control system to the primary control system, an indication of the detected imminent collision.

16 Claims, 10 Drawing Sheets

COLLISION IMMINENT DETECTION

TECHNICAL FIELD

The present disclosure relates generally to autonomous vehicles, and more particularly, to collision imminent detection.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating the vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION

Overview

Figure 1:
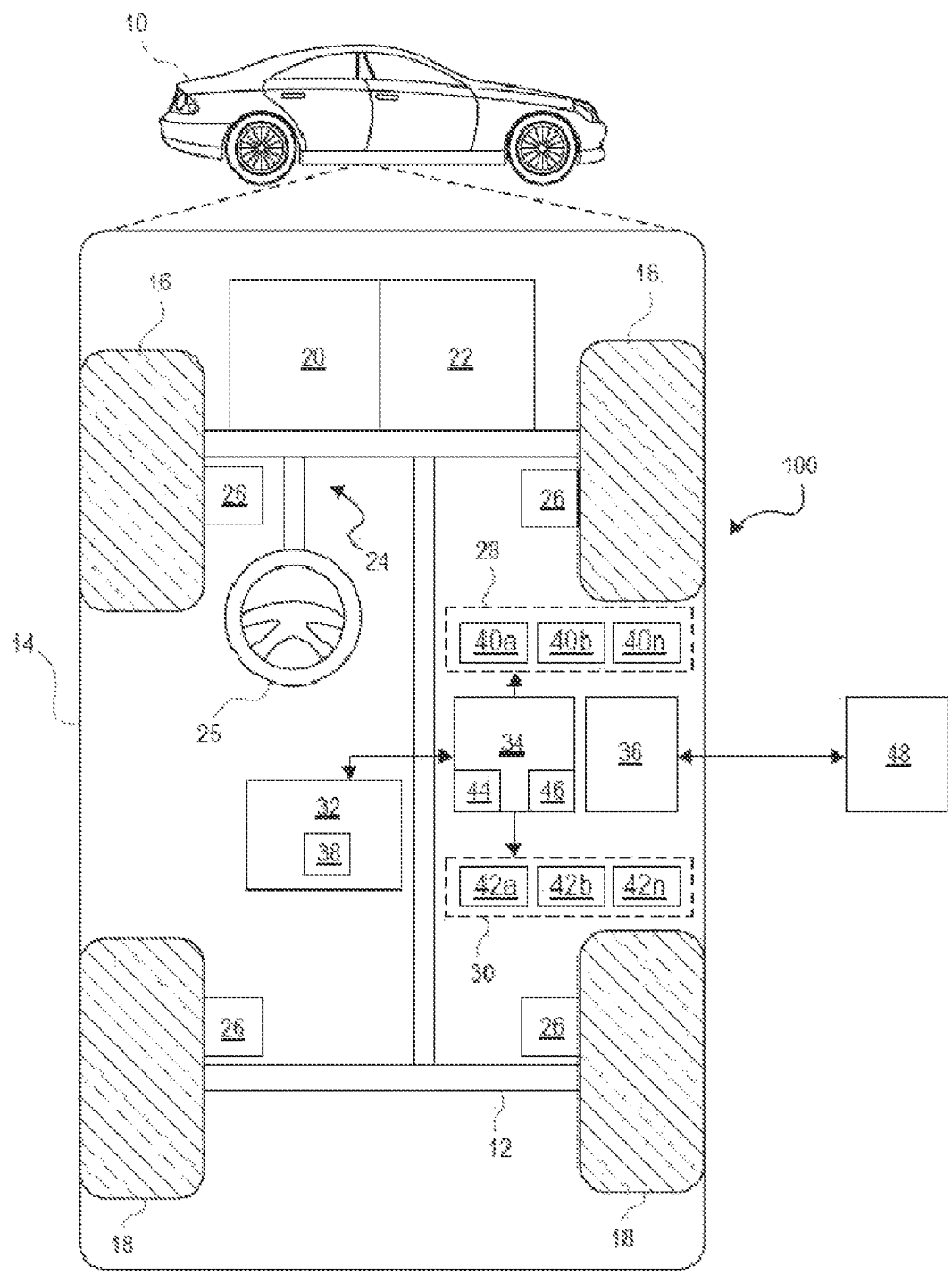
FIG. 1 illustrates an exemplary autonomous vehicle (AV) in which a primary control system and a fallback control system with imminent collision detection may be implemented, according to some embodiments of the present disclosure.

The systems, methods and devices of this disclosure have several innovative aspects, no one of which is solely responsible for the attributes disclosed herein. Details of one or more implementations of the subject matter described in this specification are set forth in the description below and the accompanying drawings.

Autonomous vehicles (AVs) can provide many benefits. For instance, AVs may have the potential to transform urban living by offering opportunity for efficient, accessible and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from point A to point B). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

Further, AVs may be equipped with systems and/or devices to avoid a collision or at least mitigate the severity of a collision. For instance, a collision avoidance system at an AV may generate a collision avoidance plan from an initial assessment between the AV and a traffic participant (e.g., an object, another vehicle, a pedestrian, a cyclist, etc.) that may participate in an imminent collision with the AV. The AV may further re-assess the imminent collision and/or refine a collision avoidance plan after some time. However, in some scenarios, an AV may be unable to detect a collision in a timely manner or fail to detect an imminent collision during the initial assessment or during the re-assessment.

The present disclosure describes mechanisms for performing imminent collision detection at a vehicle (e.g., an AV) using secondary, fallback mechanisms orthogonal to the primary mechanisms that are used for environment perception, trajectory prediction, and/or path planning for the vehicle. For example, a vehicle may include a primary control system and a fallback control system orthogonal to the primary control system, where the orthogonal fallback control system can check perception, prediction, and/or planning determined by the primary control system and provide imminent collision detection feedback to the primary control system.

As used herein, the orthogonality between a primary control system and a fallback control system may refer to algorithms, techniques, and/or processes (e.g., for perception, prediction, planning, collision detection, control, etc.) used by the fallback control system being different from (or nonoverlapping with) algorithms, techniques, and/or processes used by the primary control system. For instance, the primary control system may use machine learning algorithms, and the fallback control system may use heuristic algorithms that are based on rules, numerical solutions that are representable by mathematical equations, and can be interpreted and reasoned. The orthogonality between the primary control system and the fallback control system can minimize or avoid the primary control system and the fallback control system having the same faults, determining the same driving decision, and/or generally failing under the same conditions. That is, the fallback control system can provide algorithmic redundancy. Additionally, the fallback control system can use a less complex technique with less variables or constraints than the primary control system. In this way, the fallback control system can provide a prediction and/or detect for an imminent collision at an earlier time than the primary control system. Further, in some aspects, the orthogonality between the primary control system and the fallback control system can also be in terms of hardware. For instance, the fallback control system may include at least one processing component (e.g., a central processing unit (CPU), a graphical processing unit (GPU), etc.) that is not part of the primary control system. Furthermore, the fallback control system may utilize sensor data generated by different sensor(s) than sensor(s) that generate sensor data for the primary control system to provide further hardware redundancy.

According to an aspect of the present disclosure, a primary control system of a vehicle may compute a path for the vehicle based at least in part on first sensor data generated by onboard sensors of the vehicle. As part of computing the path, the primary control system may determine at least one of a first perception of an environment outside of the vehicle or a first prediction of trajectories of the vehicle or one or more objects in the environment. A command controller of the vehicle may generate appropriate command(s) for controlling the vehicle based on the path. A fallback control system of the vehicle may monitor for an imminent collision between the vehicle and a traffic participant or an object (e.g., another vehicle, a pedestrian, a cyclist, an obstacle, etc.) in an environment outside of the vehicle based at least in part on second sensor data generated by onboard sensors of the vehicle and information associated with the path. As part of monitoring for the imminent collision, the fallback control system may determine, independent of the primary control system, at least one of a second perception of an environment outside of the vehicle or a second prediction of trajectories of the vehicle or one or more objects in the environment. Upon detecting an imminent collision, the fallback control system may generate an indication of the detected imminent collision.

To reduce the number of false positive imminent collision detections, the fallback control system may report or indicate a detected imminent collision when the detected imminent collision is matured (e.g., has a high confidence level). For instance, the fallback control system may perform imminent collision monitoring repeatedly or periodically (e.g., according to a watchdog timer), and may report the detected imminent collision after a number of consecutive imminent collisions between the vehicle and the object are detected satisfies an imminent collision detection count threshold. Additionally or alternatively, the fallback control system may suppress an indication of an imminent collision detected between the vehicle and another traffic participant based on an assumption that the other traffic participant is observant of a traffic rule and that the other traffic participant will correct itself prior to the predicted imminent collision. Additionally or alternatively, the fallback control system may adjust the imminent collision detection count threshold and/or which rules to apply for suppressing an imminent collision indication based on the type of traffic participant that participates in the imminent collision.

In some aspects, the primary control system may determine the at least one of the first perception or the first prediction by using a machine learning model to process the first sensor data while the fallback control system may determine the at least one of the second perception of the second prediction by using heuristics-based algorithms to process the second sensor data.

In some aspects, as part of detecting the imminent collision, the fallback control system may process the second sensor data to generate motion information associated with at least the object that participates in the detected imminent collision. The fallback control system may compute a trajectory of the object based on the motion information. In some aspects, as part of generating the motion information, the fallback control system may process the second sensor data to generate a series of occupancy grid maps over a time window. The series of occupancy grid maps may be representative of a geographical area of the vehicle at a series of time instants (e.g., at time t1, t2, t3, . . . ) within the time window. Each occupancy grid map may include a plurality of grids and an indication of whether a respective grid is occupied, free, or unknown at a respective time instant. The fallback control system may further generate the motion information based on the series of occupancy grid maps.

The systems, schemes, and mechanisms described herein can provide several benefits. For example, using a primary control system to plan a path or trajectory for a vehicle and using an orthogonal fallback control system to check for imminent collision(s) along the path can reduce the likelihood of miss detecting an imminent collision between the vehicle and an object along the planned path. Additionally, applying collision maturation mechanisms to determine when and whether to indicate a detected imminent collision to the primary control system can reduce the number of false positive detections, and thus can reduce unnecessary resource utilizations. Further, 3D motion information can be generated efficiently, and thus performing imminent collision detection based on 3D motion information can reduce detection latency and allow the vehicle to respond quickly.

While the present disclosure is discussed in the context of a fallback control system performing imminent collision detection using algorithms or processes orthogonal to a primary control system that determines the vehicle's path, similar orthogonal detection mechanisms can be implemented at the primary control system instead of at the fallback control system.

Example AV

FIG. 1 illustrates an exemplary AV 10 in which a primary control system and a fallback control system with imminent collision detection may be implemented, according to some embodiments of the present disclosure.

As depicted in FIG. 1, the AV 10 may generally include a chassis 12, a body 14, front wheels 16, and rear wheels 18. The body 14 may be arranged on the chassis 12 and encloses components of the AV 10. The body 14 and the chassis 12 may jointly form a frame. The front wheels 16 and rear wheels 18 may be rotationally coupled to the chassis 12 near a respective corner of the body 14. In some examples, the chassis 12 may differ from the chassis on which the sensor arrays are mounted. For example, the sensor arrays can be mounted on the roof of the AV 10.

In various embodiments, the AV 10 may be an AV and the system 100 and/or components thereof may be incorporated into the AV 10. The AV 10 may be, for example, a vehicle that may be automatically controlled to carry passengers and/or cargo from one location to another. While the AV 10 may be depicted as a passenger car in FIG. 1, any other vehicle, including motorcycles, trucks, sport utility vehicles (SUVs), recreational vehicles (RVs), marine vessels, aircraft, and the like, can also be used as an AV.

In an example, the AV 10 may correspond to a level four or level five automation system under the Society of Automotive Engineers (SAE) "J3016" standard taxonomy of automated driving levels. Using this terminology, a level four system may indicate "high automation," referring to a driving mode in which the automated driving system performs aspects of the dynamic driving task, even if a human driver does not respond appropriately to a request to intervene. A level five system may indicate "full automation," referring to a driving mode in which the automated driving system performs aspects of the dynamic driving task under roadway and environmental conditions that can be managed by a human driver.

Implementations in accordance with the present subject matter are not limited to any taxonomy or rubric of automation categories. Furthermore, systems in accordance with the present disclosure can be used in conjunction with any autonomous or other vehicle that utilizes a navigation system and/or other systems to provide route guidance.

As shown, the AV 10 may generally include a propulsion system 20, a transmission system 22, a steering system 24, a brake system 26, a sensor system 28, an actuator system 30, data storage device 32, controller 34, and a communication system 36. The propulsion system 20 can, in various embodiments, include an internal combustion engine, an electric machine such as a traction motor, and/or a fuel cell propulsion system. The transmission system 22 may be configured to transmit power from the propulsion system 20 to the front wheels 16 and rear wheels 18 according to selectable speed ratios. According to various implementations, the transmission system 22 can include a step-ratio automatic transmission, a continuously-variable transmission, or other appropriate transmission.

The brake system 26 may be configured to provide braking torque to the front wheels 16 and rear wheels 18. Brake system 26 can, in various embodiments, include friction brakes, brake by wire, a regenerative braking system such as an electric machine, and/or other appropriate braking systems.

The steering system 24 may influence a position of the front wheels 16 and/or rear wheels 18. While depicted as including a steering wheel 25 for illustrative purposes, in some embodiments contemplated within the scope of the present disclosure, the steering system 24 may not include a steering wheel.

The sensor system 28 may include one or more sensing devices 40a-40n that sense observable conditions of the exterior environment and/or the interior environment of the AV 10. The sensing devices 40a-40n can include radio detection and ranging (RADAR) sensors, light detection and ranging (LIDAR) sensors, global positioning systems (GPSs), optical cameras, thermal cameras, time-of-flight (TOF) cameras, ultrasonic sensors, speedometers, compasses, and/or other sensors.

The actuator system 30 may include one or more actuator devices 42a-42n that control one or more vehicle features such as the propulsion system 20, the transmission system 22, the steering system 24, and the brake system 26. In various embodiments, the AV 10 can also include interior and/or exterior vehicle features not illustrated in FIG. 1, such as various doors, a trunk, and cabin features such as air conditioning, music players, lighting, touch-screen display components (such as those used in connection with navigation systems), and the like.

The data storage device 32 may store data for use in automatically controlling the AV 10. In various implementations, the data storage device 32 may store defined maps of the navigable environment. In various implementations, the defined maps may be predefined by and obtained from a remote system. For example, the defined maps may be assembled by the remote system and communicated to the AV 10 (wirelessly and/or in a wired manner) and stored in the data storage device 32. Route information can also be stored within the data storage device 32— i.e., a set of road segments (associated geographically with one or more of the defined maps) that together define a route that the user might take to travel from a start location (e.g., the user's current location) to a target location. Also, in various implementations, the data storage device 32 may store machine learning models 38 that are trained for identifying objects from sensor data captured by the sensor system 28.

In general, the data storage device 32 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any data storage devices or memory elements discussed herein should be construed as being encompassed within the broad term "memory." As will be appreciated, the data storage device 32 can be part of the controller 34, separate from the controller 34, or part of the controller 34 and part of a separate system.

The controller 34 may include a processor 44 and a computer-readable storage device or media 46. The processor 44 can be any custom-made or commercially available processor, a CPU, a GPU, an auxiliary processor among several processors associated with the controller 34, a semiconductor-based microprocessor (in the form of a microchip or chip set), any combination thereof, or generally any device for executing computer instructions. The computer-readable storage device or media 46 can include volatile and non-volatile storage in ROM, RAM, and keep-alive memory (KAM), for example. KAM may be a persistent or non-volatile memory that can store various operating variables while the processor 44 is powered down. The computer-readable storage device or media 46 can be implemented using any of a number of memory devices such as PROMs (programmable read-only memory), EPROMs (electrically PROM), EEPROMs (electrically erasable PROM), flash memory, or any other electric, magnetic, optical, resistive, or combination memory devices capable of storing data, some of which represent executable instructions, used by the controller 34 in controlling the AV 10. As will be appreciated, while the computer-readable storage device or media 46 is depicted in FIG. 1 as part of the controller 34, the computer-readable storage device or media 46 can be part of the data storage device 32.

The instructions can include one or more separate programs that comprise an ordered listing of executable instructions for implementing logical functions. The instructions, when executed by the processor 44, can receive and process signals from the sensor system 28, perform logic, calculations, methods and/or algorithms for automatically controlling the components of the AV 10, and generate control signals transmitted to the actuator system 30 to control the components of the AV 10 based on the logic, calculations, methods, and/or algorithms. Although one controller 34 is shown in FIG. 1, embodiments of the AV 10 can include any number of controllers 34 that communicate over any suitable communication medium or a combination of communication mediums and that cooperate to process the sensor signals, perform logic, calculations, methods, and/or algorithms, and generate control signals to control features of the AV 10.

In some embodiments, as will be discussed in detail below, the AV 10 may include an AV control system (e.g., the AV control system 200 of FIG. 2 and/or the AV control system 300 of FIG. 3). The AV control system may include a primary control system and a fallback control system orthogonal to the primary control system. The controller(s) 34 can be part of the primary control system and/or the fallback control system. The primary control system may implement a primary AV software stack (e.g., including perception, prediction, planning, etc.) stored as instructions and executed by the controller(s) 34. In a similar way, the fallback control system may implement a secondary fallback AV software stack (e.g., including perception, prediction, imminent detection, planning, etc.) stored as instructions and executed by the controller(s) 34. In certain aspects, the primary control system may compute a path for the AV 10 based at least in part on first sensor data collected from the sensor system 28 and provide path information to the fallback control system. The fallback control system may monitor, independent of the primary control system, for an imminent collision between the AV 10 and other object(s) in an environment based at least in part on second sensor data collected from the sensor system 28 and the path information. Upon detecting an imminent collision involving the AV 10, the fallback control system may feedback an indication of the detected imminent collision to the primary control system. In this way, the primary control system can update a planned path to avoid the collision. In some aspects, the same controller(s) 34 may be used by the primary control system and the fallback control system. In other aspects, the fallback control system may use at least one controller 34 that is not used by the primary control system (e.g., to provide hardware redundancy).

The communication system 36 may wirelessly communicates information to and from other entities 48, such as other vehicles ("V2V" communication), infrastructure ("V2I" communication), remote transportation systems, and/or user devices. In an example, the communication system 36 may be a wireless communication system configured to communicate via a wireless local area network (WLAN) using IEEE (Institute of Electrical and Electronics Engineers) 802.11 standards or by using cellular data communication (e.g., fifth-generation (5G) under the third Generation Partnership Project (3GPP)). Additional or alternate communication methods, such as a dedicated short-range communications (DSRC) channel, may also considered within the scope of the present disclosure. DSRC channels may refer to one-way or two-way short-range to medium-range wireless communication channels specifically designed for automotive use and a corresponding set of protocols and standards.

Example AV Control System

Figure 2:
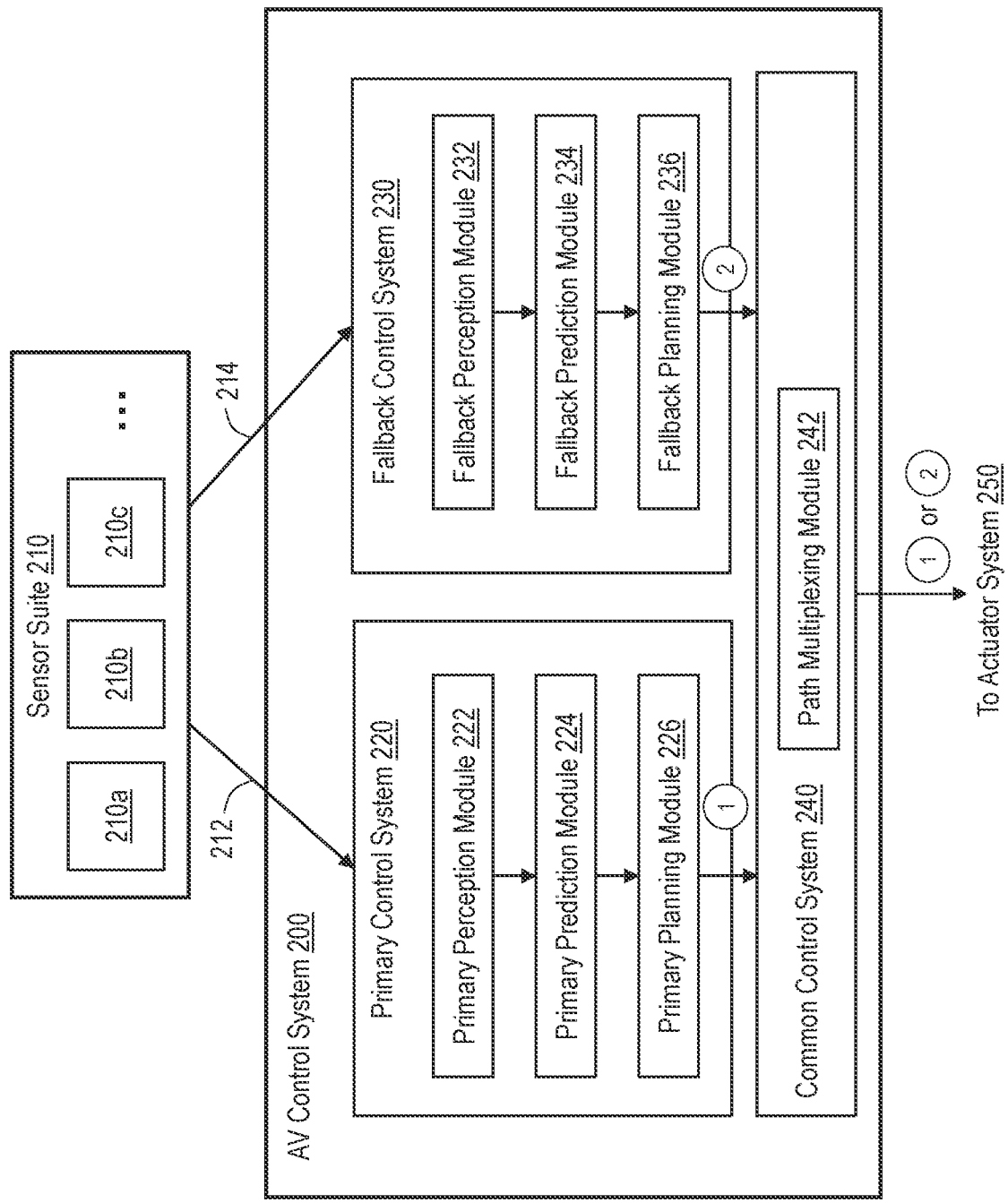
FIG. 2 is a block diagram illustrating an exemplary AV control system including a primary control system and a fallback control system, according to some embodiments of the present disclosure.
Figure 3:
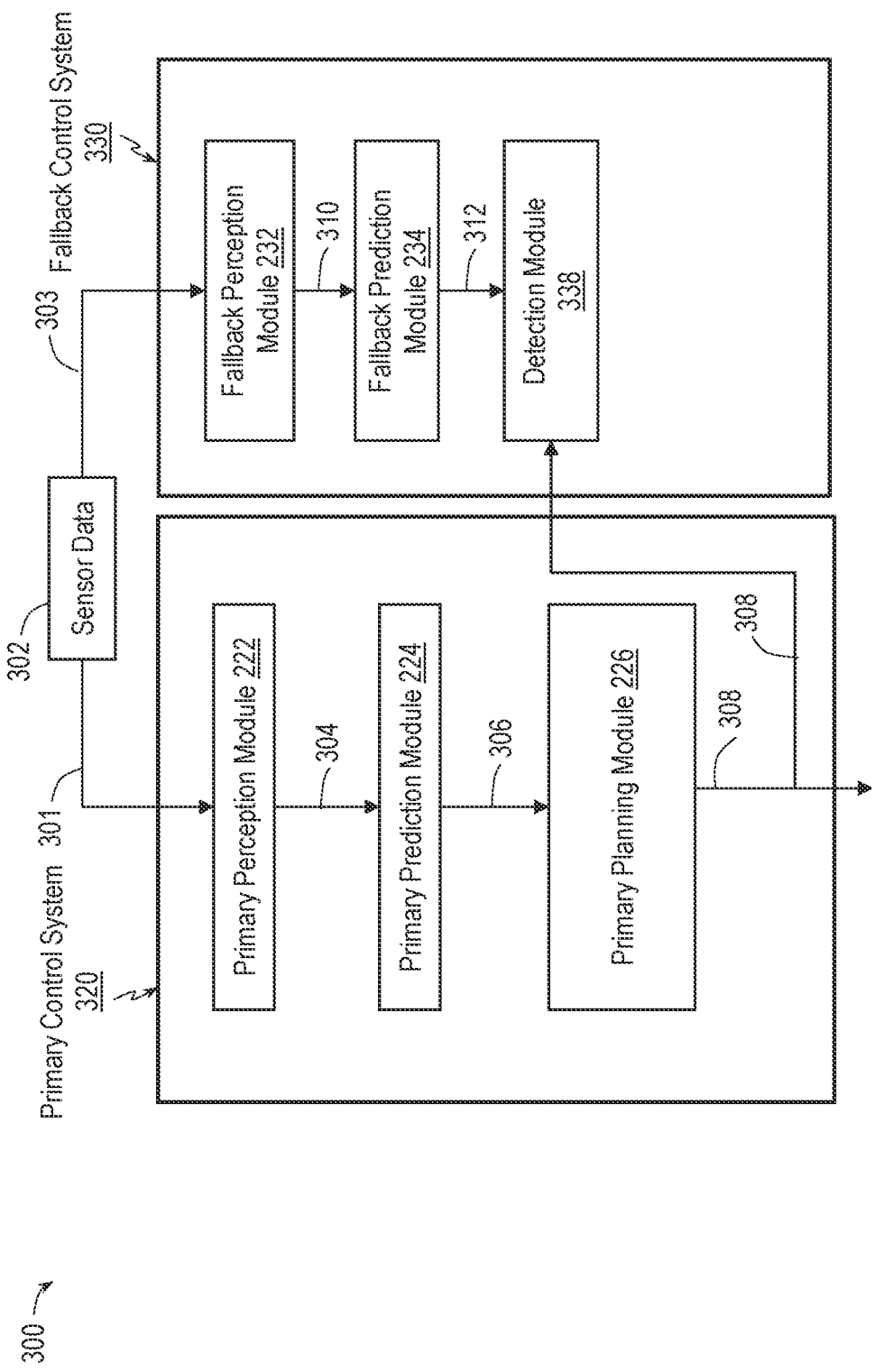
FIG. 3 is a block diagram illustrating an exemplary AV control system including a fallback control system that implements imminent collision detection, according to some embodiments of the present disclosure.

FIGS. 2 and 3 illustrate various AV control systems that include orthogonal primary and fallback control systems. In particular, FIG. 3 illustrates an AV control system that leverages the orthogonality provided by the fallback control system for imminent collision detection.

FIG. 2 is a block diagram illustrating an exemplary AV control system 200 including a primary control system 220 and a fallback control system 230 orthogonal to the primary control system 220, according to some embodiments of the present disclosure. The AV control system 200 may be implemented by an AV such as the AV 10 of FIG. 1. At a high level, under a normal (or nominal) condition, the primary control system 220 may control the AV and the fallback control system may operate in a standby mode (e.g., without controlling the AV). Upon a detection of a faulty (or failure) condition at the primary control system 220, the fallback control system 230 may take over the control of the AV.

As shown in FIG. 2, the AV control system 200 may receive sensor data from a sensor suite 210 of the AV. More specifically, the primary control system 220 may receive first sensor data 212 from the sensor suite 210, and the fallback control system 230 may receive second sensor data 214 from the sensor suite 210. The sensor suite 210 may be similar to the sensor system 28 of the AV 10. For instance, the sensor suite 210 may include a variety of sensors, which may broadly categorize into a computer vision ("CV") system, localization sensors, and driving sensors. In particular, the sensor suite 210 may include one or more vision sensors 212*a* (e.g., camera sensors). The one or more vision sensors 212*a* may capture images of the surrounding environment of the AV. For instance, the one or more vision sensors 212*a* may capture images of various objects such as trees, road signs, the traffic lights, buildings, objects, etc. in an environment of the AV. In some instances, the sensor suite 210 may include multiple vision sensors 212*a* to capture different views, e.g., a front-facing camera, a back-facing camera, and side-facing cameras. In some instances, one or more vision sensors may be implemented using a high-resolution imager with a fixed mounting and field of view. One or more vision sensors 212*a* may have adjustable field of views and/or adjustable zooms. In some embodiments, the vision sensors 212*a* may capture images continually or at some intervals during operation of the AV. The vision sensors 212*a* may transmit the captured images (as part of first sensor data 212) to the primary control system 220 for further processing, for example, to assist the AV 10 in determining certain action(s) to be carried out by the AV.

Additionally or alternatively, the sensor suite 210 may include one or more LIDAR sensors 212*b*. The one or more LIDAR sensors 212*b* may measure distances to objects in the vicinity of the AV using reflected laser light. The one or more LIDAR sensors 212*b* may include a scanning LIDAR that provides a point cloud of the region scanned. The one or more LIDAR sensors 212*b* may have a fixed field of view or a dynamically configurable field of view. The one or more LIDAR sensors 212*b* may produce a point cloud (e.g., a collection of data points in a 3D space) that describes the shape, contour, and/or various characteristics of one or more object in the surrounding of the AV and a distance of the object away from the AV. For instance, the point cloud may include data points representing various objects such as trees, road signs, the traffic lights, buildings, objects, etc. in an environment of the AV. The one or more LIDAR sensors 212*b* may transmit the captured point cloud (as part of first sensor data 212) to the primary control system 220 for further processing, for example, to assist the AV in determining certain action(s) to be carried out by the AV.

Additionally or alternatively, the sensor suite 210 may include one or more RADAR sensors 212*c*. RADAR sensors 212*c* may operate in substantially the same way as LIDAR sensors 212*b*, but instead of the light waves used in LIDAR sensors, RADAR sensors use radio waves (e.g., at frequencies of 24, 74, 77, and 79 gigahertz (GHz)). The one or more RADAR sensors 212*c* may transmit the captured RADAR data (as part of first sensor data 212) to the primary control system 220 for further processing. For example, the time taken by the radio waves to return from the objects or obstacles to the AV is used for calculating the distance, angle, and velocity of the obstacle in the surroundings of the AV.

Additionally or alternatively, the sensor suite 210 may include one or more location sensors. The one or more location sensors may collect data that is used to determine a current location of the AV. The location sensors may include a GPS sensor and one or more inertial measurement units (IMUs). The one or more location sensors may further include a processing unit (e.g., a component of an onboard computer of the AV, or a separate processing unit) that receives signals (e.g., GPS data and IMU data) to determine the current location of the AV. The location determined by the one or more location sensors can be used for route and maneuver planning. The location may also be used to determine when to capture images of a certain object. The location sensor may transmit the determined location information to the primary control system 220 for further processing, for example, to assist the AV in determining certain action(s) to be carried out by the AV.

In general, the sensor suite 210 may include any suitable sensors including but not limited to, photodetectors, one or more cameras, RADAR sensors, sound navigation and ranging (SONAR) sensors, LIDAR sensors, GPS, wheel speed sensors, weather sensors, IMUs, accelerometers, microphones, strain gauges, pressure monitors, barometers, thermometers, altimeters, etc. The sensors may be located in various positions in and around the AV. Further, the sensors suite 210 may also transmit sensor data (the second sensor data 214) to the fallback control system 230 for fallback operations as will be discussed more fully below.

As further shown in FIG. 2, the AV control system 200 may include a common control system 240 in communication with the primary control system 220 and the fallback control system 230. The primary control system 220 may determine a first action for the AV based on the first sensor data 212, and the fallback control system 230 may determine an alternative action for the AV based on the second sensor data 214. The fallback control system 230 may determine the alternative action for the AV simultaneously with the primary control system 220 determining the first action, and the common control system 240 may select between the first action or the alternative action depending on the operational state of the primary control system 220.

For example, under a normal (or nominal) condition, the common control system 240 may listen to the primary control system 220 and generate control command(s) and/or parameter(s) according to the first action (determined by the primary control system 220) and send the control command(s) and/or parameter(s) to an actuator system 250 (e.g., the actuator system 30) the of the AV as shown by the circle with the numeral 1. That is, while the fallback control system 230 may determine the alternative action in parallel with the primary control system 220 determining the first action, the fallback control system 230 operates in a standby mode (e.g., without controlling the AV) under the normal condition. If, however, the primary control system 220 experiences a failure or faulty event, the common control system 240 may switch to listen to the fallback control system 230 and generate control commands or control parameters according to the alternative action (determined by the fallback control system 230) and send control commands and/or parameters to the actuator system 250 of the AV as shown by the circle with the numeral 2.

As further shown in FIG. 2, the primary control system 220 may include a primary perception module 222, a primary prediction module 224, and a primary planning module 226, each of which may be implemented using any suitable combination of hardware and/or software component(s). For example, the primary perception module 222, the primary prediction module 224, and the primary planning module 226 may coordinate with each other to determine a first action for the AV.

More specifically, the primary perception module 222 may analyze the received sensor data (e.g., camera images, point clouds, location information, etc.) provided by the sensor suite 210 and output an understanding or a perception of the environment surrounding the AV. In particular, the primary perception module 222 may extract information related to navigation and making driving decisions. For instance, the primary perception module 222 may detect objects such as other cars, pedestrians, trees, bicycles, and objects traveling on or near the roadway systems on which the AV traveling, and indications surrounding the AV (such as construction signs, traffic cones, traffic lights, stop indicators, and other street signs). In some examples, the primary perception module 222 may include one or more classifiers trained using machine learning to identify particular objects. For example, a multi-class classifier may be used to classify each object in the environment of the AV as one of a set of potential objects, e.g., a vehicle, a pedestrian, or a cyclist. As another example, a pedestrian classifier may recognize pedestrians in the environment of the AV, a vehicle classifier may recognize vehicles in the environment of the AV, etc.

The primary prediction module 224 may perform predictive analysis based on at least some of the recognized objects or perception provided by the primary perception module 222, e.g., to determine projected pathways of other vehicles, bicycles, and pedestrians. The primary prediction module 224 may also predict the AV's future trajectories, which may enable the AV to make appropriate navigation decisions. In some examples, the primary prediction module 224 may include one or more prediction models trained using machine learning to determine future motions and/or trajectories of other traffic agents and/or of the AV itself.

The primary planning module 226 may plan maneuvers for the AV based on map data, data received from the primary perception module 222, prediction information received from the primary prediction module 224, and navigation information, e.g., a route instructed by a fleet management system. In some examples, the primary planning module 226 may receive map data from a map database (e.g., stored locally at the AV or at a remote server) including data describing roadways (e.g., locations of roadways, connections between roadways, roadway names, speed limits, traffic flow regulations, toll information, etc.), buildings (e.g., locations of buildings, building geometry, building types), and other objects (e.g., location, geometry, object type). In some instances, the map database may further include data describing other features, such as bike lanes, sidewalks, crosswalks, traffic lights, parking lots, etc. In general, a map database may include data describing any known, relatively fixed features and/or objects in a geographical area. In some examples, the primary planning module 226 may receive data from the primary perception module 222 describing at least some of the features described by the map data in the environment of the AV. The primary planning module 226 may compare map data with data from the primary perception module 222 to confirm the accuracy of the map data and to determine the precise positions of perceived objects on the map.

The primary planning module 226 may determine a pathway for the AV to follow based on the perception(s)

and/or the prediction(s), for example, a route from point A to point B. When the primary perception module 222 detects moving objects in the environment of the AV, the primary planning module 226 may determine the pathway for the AV based on predicted behaviors of the objects provided by the primary prediction module 224 and right-of-way rules that regulate behavior of vehicles, cyclists, pedestrians, or other objects. The pathway may include locations for the AV to maneuver to, and timing and/or speed of the AV in maneuvering to the locations. In some aspects, as part of determining the pathway for the AV, the primary planning module 226 may utilize a non-convex solver (NCS). An NCS may utilize a graph solver to generate collision-free trajectories for the vehicle with suitable risk and comfort qualities. The primary planning module 226 may select a branch of behavior for the AV to execute based on the collision-free trajectories. Based on the selected branch, the primary planning module 226 may perform motion planning in which a trajectory is planed for the AV. In general motion, motion planning may consider the state of the current traffic participants, the surrounding environment of the AV, and the destination.

In some scenarios, the primary control system 220 can experience failures or faulty events during which the fallback control system 230 may provide fallback controls to allow the AV to recover from the failures or faulty conditions. To that end, the fallback control system 230 may include a fallback perception module 232, a fallback prediction module 234, and a fallback planning module 236, each of which may be implemented using any suitable combination of hardware and/or software component(s). For example, the fallback perception module 232, the fallback prediction module 234, and the fallback planning module 236 may coordinate with each other to determine an alternative action for the AV. As explained above, the alternative action may not be activated under a normal condition and may be activated when a failure or a faulty condition occur at the primary control system 220.

The fallback perception module 232, the fallback prediction module 234, and the fallback planning module 236 may provide substantially the same functions as the primary perception module 222, the primary prediction module 224, and the primary planning module 226, respectively, but may utilize algorithms that are different from (or orthogonal to) algorithms utilized by the primary perception module 222, the primary prediction module 224, and the primary planning module 226. Using orthogonal algorithms between the primary control system 220 and the fallback control system 230 can advantageously avoid having both the primary control system 220 and the fallback control system 230 make the same faulty decision or fail at the same time.

In some aspects, the fallback perception module 232 may utilize heuristic algorithms and/or rules to determine a perception of an environment surrounding the AV instead of machine learning. For instance, the fallback perception module 232 may operate on LIDAR-only sensor data. The fallback perception module 232 may determine the presence of an object, a distance relative to the AV and/or a velocity of an object based on measurements determined from LIDAR point cloud data (e.g., the second sensor data 214). The fallback prediction module 234 may utilize heuristic algorithms and/or rules to predict trajectories of the AV and/or other traffic participants in the AV's vicinity. For instance, the fallback prediction module 234 may use linear extrapolation techniques and/or any other numerical analysis techniques that are not based on machine learning. As will be discussed more fully below, the fallback perception module 232 can generate occupancy grid maps based on the LIDAR point clouds to identify free space(s), occupied space(s), and/or unknown space(s) in a geographical area surrounding the AV.

In some aspects, the fallback perception module 232 may generate the occupancy grid maps repeatedly at a substantially fast rate (e.g., according to a scan frequency of the LIDAR sensors in use) to track objects that are in motion and provide motion information about the tracked objects. Accordingly, the fallback prediction module 234 can predict trajectories of other traffic participants near the AV using the 3D motion grid information.

In some aspects, the fallback planning module 236 may utilize heuristic algorithms and/or rules to plan an alternative path for the AV, for example, to bring the AV to a complete stop at a comfortable deceleration speed and without causing a collision. Additionally or alternatively, the fallback planning module 236 may guide the AV away from a high-risk area (e.g., an intersection, an oncoming traffic lane, an emergency driveway, etc.). For instance, the fallback planning module 236 may perform a search in a search space (e.g., representing an area around the AV and may be a continuous search space or a discretized search space) to determine candidate paths for the AV based on the perception and/or the predictions, determine a heuristic cost for each candidate path, and select a target path with a minimal heuristic cost from the candidate paths. In an example, a heuristic cost may be assigned to each segment of a path, and the cost may vary depending on whether the path segment causes the AV to go straight, turn left, turn right, or reverse, etc. Additionally or alternatively, the fallback planning module 236 may utilize polynomial fitting techniques to determine a path for the AV. In general, the fallback planning module 236 may utilize non-machine learning based techniques.

Further, the fallback planning module 236 may compute a path for the AV using less restrictive planning constraints than the primary planning module 226. As will discussed more fully below, in some instances, the fallback planning module 236 may use free space planning (e.g., without any lane limitation or generally less structural constraints) as opposed to the NCS used by the primary planning module 226. Additionally or alternatively, the fallback planning module 236 may utilize a reduce set of motions for the AV compared to the primary planning module 226. For instance, the fallback planning module 236 may plan a motion including braking, steering the AV within a certain angle less than the full angle range available to the vehicle, decelerating with a certain speed limit less that the full speed range available to the vehicle, etc.

As further shown in FIG. 2, the common control system 240 may include a path multiplexer module 242, which may be implemented using any suitable combination of hardware and/or software component(s). The path multiplexer module 242 may receive a first action from the primary control system 220 and an alternative action from the fallback control system 230. The path multiplexer module 242 may switch between the primary control system 220 and fallback control system 230 based on whether the AV is operating under a normal condition or a faulty condition. For instance, the path multiplexer module 242 may send appropriate commands to instruct the actuator system 250 (e.g., actuators, steering wheel, throttle, brakes, etc.) of the AV to maneuver according to a pathway (or the first action) determined by the primary planning module 226 under a normal condition. Upon a failure or faulty event at the primary control system 220, the path multiplexer module 242 may send appropriate commands to instruct the actuator system 250 to maneuver according to a pathway (or the alternative action) determined by the fallback planning module 236. In some examples, the faulty event may be triggered by a sensor failing to generate sensor data that is relied on by the primary control system 220, the primary perception module 222 failing to determine a perception, the primary prediction module 224 failing to predict a trajectory for the vehicle and/or other traffic participants in the environment of the vehicle, and/or the primary planning module 226 failing to compute a path for the vehicle.

In some aspects, the common control system 240 may determine whether a failure has occurred at the primary control system 220 based on notifications provide by the primary control system 220 and/or other diagnostic or health information which may be collected by the AV control system 200. In some instances, the common control system 240 may further include a health monitoring or diagnostic module to monitor for errors, failures, and/or faulty conditions associated with the primary control system 220. In other instances, the health monitoring and/or diagnostic can be implemented as part of the path multiplexer module 242.

While FIG. 2 illustrates the primary control system 220 and the fallback control system 230 communicating with the same common control system 240, aspects are not limited thereto. For example, the primary control system 220 and the fallback control system 230 can each communicate with a different control system (e.g., different processing components) to generate control commands for controlling the AV according to respective actions, and the respective control systems can coordinate with each other to control the AV. Further, while FIG. 2 illustrates the modules 222, 224, and 226 as separate modules in the primary control system 220, these modules can be combined in any suitable manner. Similarly, the modules 232, 234, and 236 at the fallback control system 230 may be combined in any suitable manner.

In some aspects, it may be desirable to leverage the orthogonality between the primary control system 220 and the fallback control system 230 to facilitate imminent collision detection at the AV. For instance, the orthogonal perception, prediction, and/or planning mechanisms used by the fallback control system 230 can be used to crosscheck or validate the perception, prediction, and/or planning determined by the primary control system 220.

FIG. 3 is a block diagram illustrating an exemplary AV control system 300 including a fallback control system 330 that implements imminent collision detection, according to some embodiments of the present disclosure. The AV control system 300 may be implemented by an AV such as the AV 10 of FIG. 1. As shown in FIG. 3, the AV control system 300 may include a primary control system 320 and a fallback control system 330. The primary control system 320 and the fallback control system 330 of FIG. 3 share many elements with the primary control system 220 and the fallback control system 230 of FIG. 2, respectively; for brevity, a discussion of these elements is not repeated, and these elements may take the form of any of the embodiments disclosed herein.

As shown in FIG. 3, the fallback control system 330 may include a detection module 338 in addition to the fallback perception module 232 and the fallback prediction module 234. The detection module 338 may be implemented using any suitable combination of hardware and/or software component(s). For simplicity, FIG. 3 may illustrate only modules that are salient for imminent collision detection. However, the primary control system 320 and/or the fallback control system 330 can include other modules related to determining actions and controls for the AV.

Similar to the primary control system 220 of FIG. 2, the primary control system 320 may collect at least a first portion 301 sensor data 302 generated by onboard sensors (e.g., the sensor suite 210) of AV. The first sensor data portion 301 may be similar to the first sensor data 212. The primary perception module 222 may determine a perception 304 of an environment outside of the AV and the primary prediction module 224 may determine a prediction 306 of trajectories of the AV and/or other object(s) in the environment. The primary planning module 226 may generally perform the same operations as discussed above with reference to FIG. 2, for example, computing a path for the AV based on the determined perception 304 and prediction 306 and providing path information 308 to a command controller of the AV (e.g., at a common control system similar to the common control system 240) to generate command(s) for controlling the AV.

Similar to the fallback control system 230 of FIG. 2, the fallback control system 330 may collect at least a second portion 303 of the sensor data 302. The second sensor data portion 303 may be similar to the second sensor data 214. The fallback perception module 232 may determine a perception 310 of an environment outside of the AV, and the fallback prediction module 234 may determine a prediction 312 of trajectories of the AV and/or other object(s) in the environment. The fallback perception module 232 and the fallback prediction module 234 may operate independent of the primary control system 320 and may utilize algorithms and/or processes different from (or orthogonal to) mechanism used by the primary perception module 222 and the primary prediction module 224, respectively, as discussed above with reference to FIG. 2.

In some aspects, the detection module 338 may receive the path information 308 generated by the primary planning module 226. The detection module 338 may monitor for an imminent collision between the AV and an object (e.g., another vehicle, a pedestrian, a cyclist, an obstacle, etc.) in the environment based on the received path information 308 and its own perception 310 and/or prediction 312. Because the fallback perception module 232 and the fallback prediction module 234 utilize mechanisms, processes, algorithms, and/or techniques that are orthogonal to the primary perception module 222 and the primary prediction module 224, respectively, the perception 310 and/or prediction 312 may be different from the perception 304 and prediction 306 determined by the primary control system 320, respectively. For instance, the detection module 338 may detect an imminent collision that the primary planning module 226 fails to detect and/or account for during path planning.

Upon detecting an imminent collision involving the AV, the detection module 338 may generate an indication of the detected imminent collision, for example, for reporting. The indication can include information about the detected imminent collision, for example, including but not limited to, an indication of the object with which the AV may collide with, a classification of the object (e.g., whether the object is a vehicle, a pedestrian, a bike, a stationary obstacle, etc.), a predicted location and/or time at which the detected imminent collision may occur, and/or a predicted traveling velocity of the object.

Figure 4:
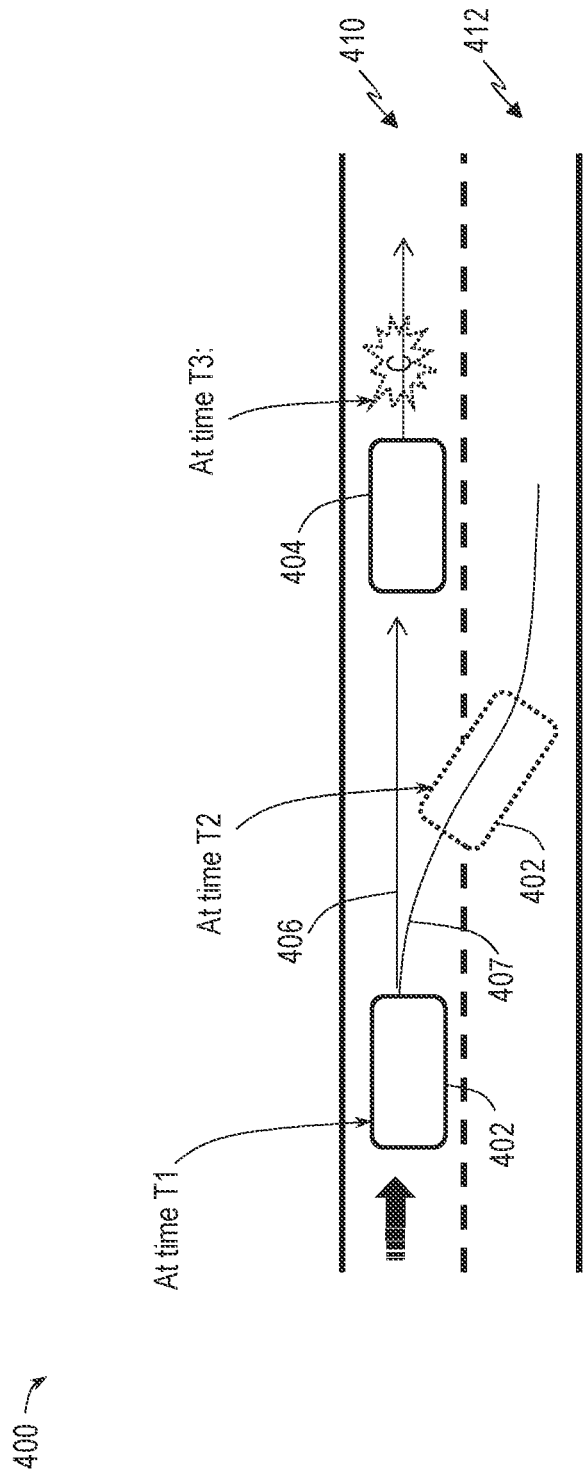
FIG. 4 illustrates an exemplary imminent collision detection scenario, according to some embodiments of the present disclosure.
Figure 5:
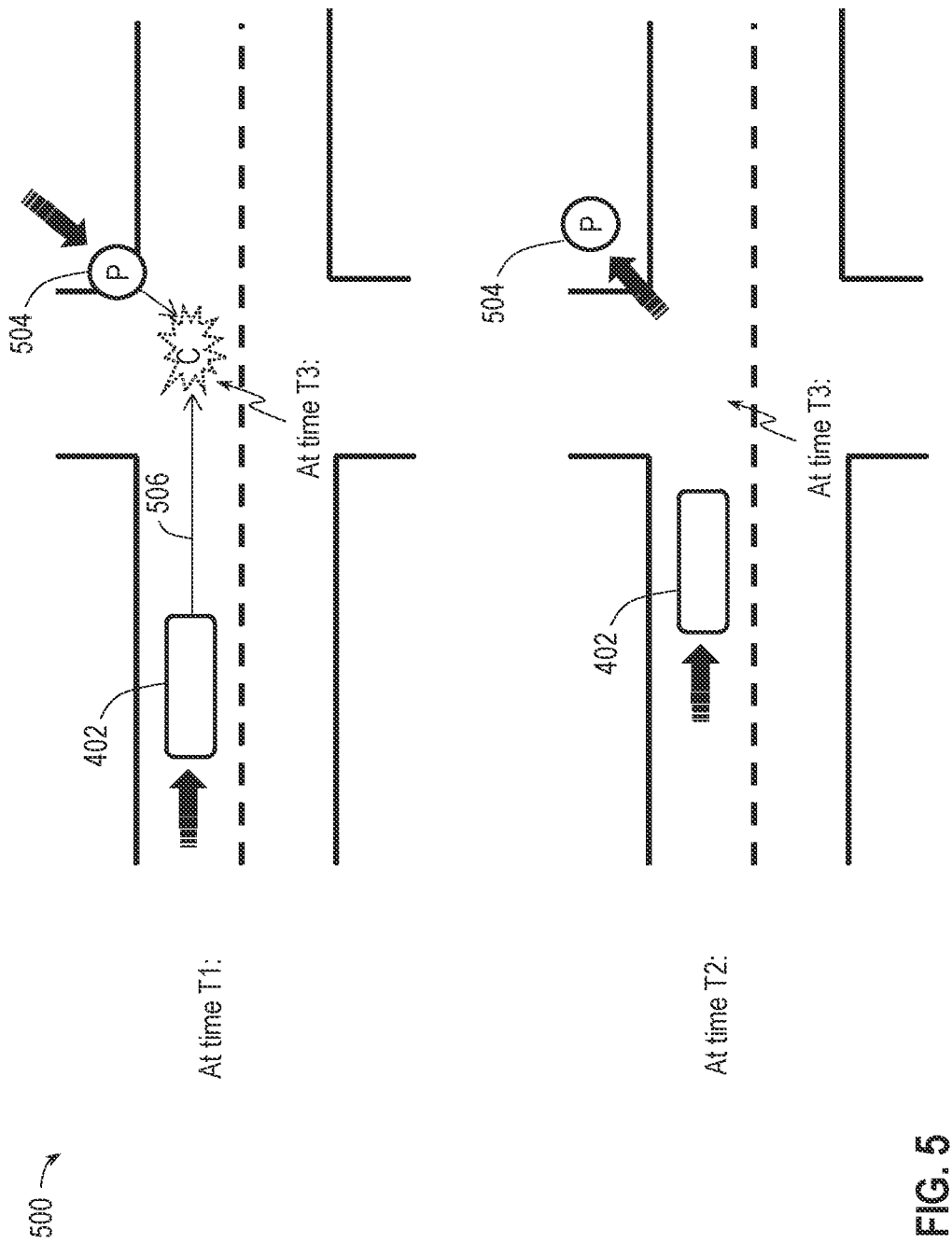
FIG. 5 illustrates an exemplary imminent collision detection scenario, according to some embodiments of the present disclosure.

In some aspects, the detection module 338 may determine when to report a detected imminent collision detection and when not to report an imminent collision detection (e.g., suppress an imminent collision trigger) using a state machine as will be discussed more fully below with reference to FIG. 6. Some examples of scenarios related to when the detection module 338 may trigger or suppress a trigger for a detected imminent collision are shown in FIGS. 4 and 5. Further, in some aspects, the detection module 338 may monitor for an imminent collision using 3D motion grid information as will be discussed more fully below with reference to FIGS. 8 and 9. The detection module 338 may generally report the detected imminent collision by providing or transmitting an indication of the detected imminent collision and the AV may respond to the indication in a variety of ways. For instance, the AV may generally utilize the imminent collision information to update a driving plan for the AV.

While FIG. 3 illustrates the orthogonal perception, prediction, and imminent detection performed by the fallback control system 330 separate from the primary control system 320, any one or more of the orthogonal perception, prediction, and imminent detection can be implemented as part of the primary prediction and/or planning at the primary control system 320.

Example Traffic Scenarios

FIGS. 4 and 5 illustrate various scenarios associated with imminent collision detection at an AV 402 (e.g., AV 10). For instance, the AV 402 may include an AV control system similar to the AV control system 200 of FIG. 2 and/or the AV control system 300 of FIG. 3. The AV control system of the AV 402 may include a primary control system similar to the primary control systems 220 and/or 320 and a fallback control system similar to the fallback control systems 230 and/or 330.

FIG. 4 illustrates an exemplary imminent collision detection scenario 400, according to some embodiments of the present disclosure. In the scenario 400, at time T1, the AV 402 may be traveling along a lane 410 based on a path 406 planned by a primary control system of the AV 402. Another vehicle 404 may also be traveling along the lane 410 ahead of the AV 402. The AV 402 may be traveling at a higher speed than the vehicle 404. The fallback control system of the AV 402 may detect that an imminent collision (shown by the polygon with the symbol "C") may occur between the AV 402 and the other vehicle 404 at a future time T3 if both the AV 402 and the other vehicle 404 continue in their respective paths or trajectories. Accordingly, the fallback control system of the AV 402 may send or report an indication of the detected imminent collision. In response to the indicated detected imminent collision, the AV 402 may compute an updated path 407 for the AV 402. As shown, the AV 402 travels on the updated path 407 in which a lane change is made to the lane 412 at time T2. Accordingly, the AV 402 may avoid colliding with the vehicle 404 at time T3.

In some aspects, the AV 402 may implement the imminent collision detection and the path update using mechanisms as discussed above with reference to FIG. 3. In some aspects, the fallback control system (or a detection module such as the detection module 338) of the AV 402 may perform imminent collision monitoring repeatedly, for example, according to a watchdog timer. The fallback control system may validate a detected imminent collision before reporting it to the primary control system (e.g., to reduce false positive detections) as will be discussed more fully below with reference to FIG. 6.

FIG. 5 illustrates an exemplary imminent collision detection scenario 500, according to some embodiments of the present disclosure. In the scenario 500, at time T1, the AV 402 may be traveling towards an intersection based on a path 506 planned by a primary control system of the AV 402. A pedestrian 504 (shown by the circle with the symbol "P") may be walking towards the intersection. The fallback control system of the AV 402 may detect that an imminent collision (shown by the polygon with the symbol "C") may occur between the AV 402 and the pedestrian 504 at a future time T3 if both the AV 402 and the pedestrian 504 continue in their respective paths or trajectories.

In some aspects, it may be desirable for the fallback control system of the AV 402 to perform another imminent collision detection at a later time, for example, before time T3, to confirm or re-check if the imminent collision may still take place. In the illustrated example of FIG. 5, at time T2, the pedestrian 504 decided to walk back away from the intersection, for example, based on seeing the AV 402 approaching. As such, when the fallback control system of the AV 402 re-assess the imminent collision detected earlier, the fallback control system of the AV 402 may be aware that the pedestrian 504 has changed his/her path or trajectory to move away from the intersection, and thus the imminent collision detected earlier is no longer valid. If the fallback control system of the AV 402 had reported the imminent collision at time T1, the imminent collision would have been a false positive detection. Accordingly, it may be desirable for the fallback control system to perform imminent collision detection multiple times (e.g., before the predicted collision time) and alert the primary control system if the imminent collision continue to exist, for example, using the state machine shown in FIG. 6. Further, in some aspects, the fallback control system can make an assumption that a traffic participant may be observant of traffic rule(s). For instance, the pedestrian 504 may turn around instead of continuing into the intersection based on the AV 402 has the right-of-way.

Example State Machine for Imminent Collision Detection

Figure 6:
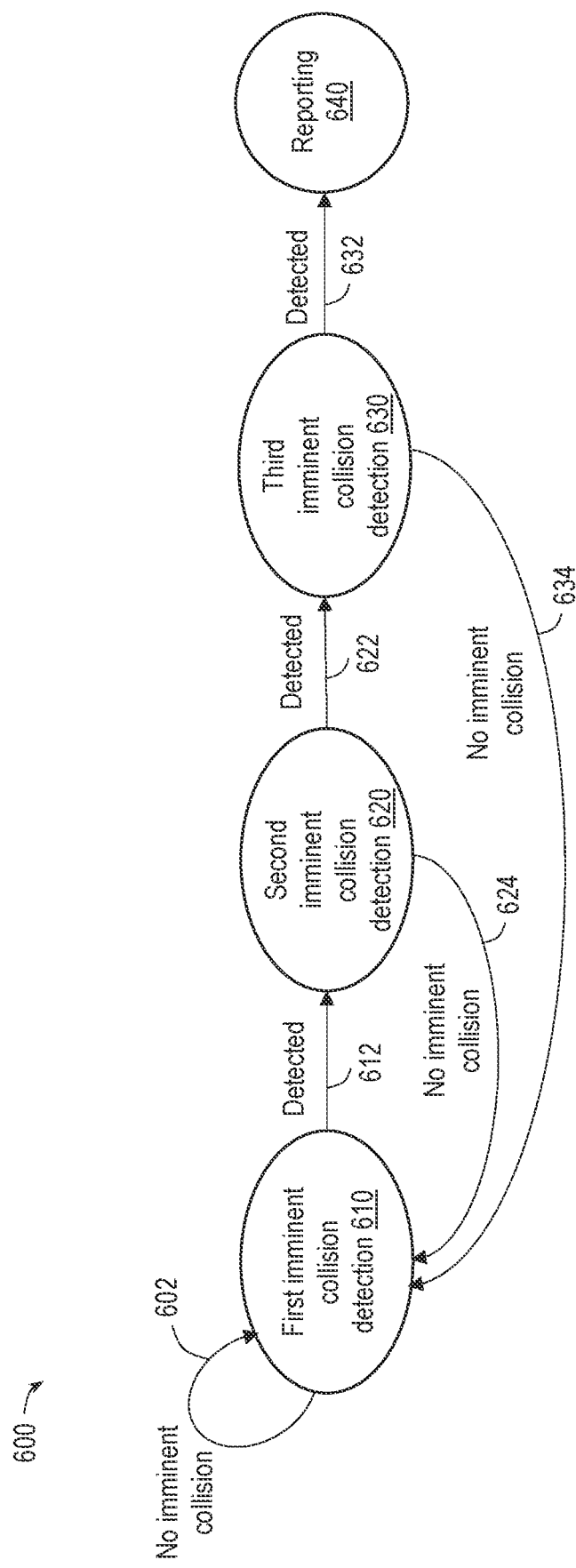
FIG. 6 illustrates an exemplary imminent collision detection state machine, according to some embodiments of the present disclosure.

FIG. 6 illustrates an exemplary imminent collision detection state machine 600, according to some embodiments of the present disclosure. The state machine 600 may be implemented by the detection module 338 of FIG. 3 or any fallback control system (e.g., the fallback control system 330) of an AV such as the AV 10 of FIG. 1 or the AV 402 of FIGS. 4-5. To validate or confirm a detected imminent collision, the state machine 600 may include multiple imminent collision detection states (e.g., 2, 3, 4, 5 or more) and a reporting state. In the illustrated example, the state machine 600 includes three imminent collision detection states, shown as a first imminent collision detection state 610, a second imminent collision detection state 620, and a third imminent collision detection state 630, and a reporting state 640.

In operation, the detection module 338 may begin at the first imminent collision detection state 610. The detection module 338 may monitor for an imminent collision between the AV and an object or traffic participant (e.g., the vehicle 404 of FIG. 4 and/or pedestrian 504 of FIG. 5) in an environment of the AV, for example, using mechanisms discussed above with reference to FIG. 3. If the detection module 338 determines that no imminent collision is detected as shown by 602, the detection module 338 may repeat the monitoring and remain in the first imminent collision detection state 610. If, however, the detection module 338 detected an imminent collision between the AV and an object in the environment as shown by 612, the detection module 338 may transition to the second imminent collision detection state 620.

While in the second imminent collision detection state 620, the detection module 338 may perform a second imminent collision detection (another detection) between the AV and the same object. In some aspects, the detection module 338 may perform the second imminent collision detection based on a watchdog timer. For instance, the watchdog timer may be configured to generate a tick (e.g., at every 10 ms, 20 ms, 30 ms, or more), and the detection module 338 may perform imminent collision detection as triggered by the tick. In other words, the imminent collision detection may be performed according to a timer expiration. For instance, the timer may be configured to expire at every X time unit, where X can be any suitable time duration. If the detection module 338 determines that the detected imminent collision is no longer a threat or valid as shown by 624, the detection module 338 may return to the first imminent collision detection state 610. If, however, the detection module 338 detected the imminent collision between the AV and the object again as shown by 622, the detection module 338 may transition to the third imminent collision detection state 630. In general, the detection module 338 may perform imminent collision detection on each path information update received from a primary control system (e.g., the primary control system 220 and/or 320), where the update can be received at a certain interval between ticks (e.g., every 10 ms, 20 ms, 30 ms, or more).

The detection module 338 may operate in substantially the same manner in the third imminent collision detection state 630 as in the second imminent collision detection state 620. For instance, if the detection module 338 determines that the detected imminent collision is no longer a threat or valid as shown by 634, the detection module 338 may return to the first imminent collision detection state 610. If, however, the detection module 338 detected the imminent collision between the AV and the object again as shown by 632, the detection module 338 may transition to the reporting state 640. In the reporting state 640, the detection module 338 may report the detected imminent collision to a primary control system (e.g., the primary control system 220 and/or 320).

Stated differently, the detection module 338 may report a detected imminent collision after a number of consecutive detected imminent collisions between the AV and the same object satisfies a certain threshold. In the illustrated example of FIG. 6, the threshold is 3. However, the threshold can be any suitable value, for example, 2, 3, 4, 5 or more. Further, in some aspects, the threshold can be adjusted based on the type of traffic participant that may participate in an imminent collision with the AV. For example, the state machine 600 may use one threshold when the traffic participant is a vehicle and a different threshold when the traffic participant is a pedestrian.

In some aspects, the time duration between each imminent collision detection and the threshold for determining when to report a detected imminent collision can be tuned or adjusted so that an imminent collision can be detected in a timely manner and the false positive detection rate is sufficiently low so that the primary control system of the AV may respond early enough to avoid a collision and computing resources can be utilized optimally.

In some aspects, the detection module 338 may monitor for an imminent collision in any of the first imminent collision detection state 610, the second imminent collision detection state 620, and the third imminent collision detection state 630 using 3D motion grid information as will be discussed more fully below with reference to FIGS. 8 and 9.

In general, the detection module 338 may implement the state machine 600 in any suitable ways, for example, using timers and/or counters. For instance, the detection module 338 may initialize a counter to 0, increment the counter by 1 every time when an imminent collision (between the AV and the same object) is detected, and report the detected imminent collision when the counter reaches the threshold. If, however, the detection module 338 determines that a previously detected imminent collision no longer exists, the detection module 338 may reset the counter to 0.

Example AV Fallback Control System with 3D Motion Grid Generation

Figure 7:
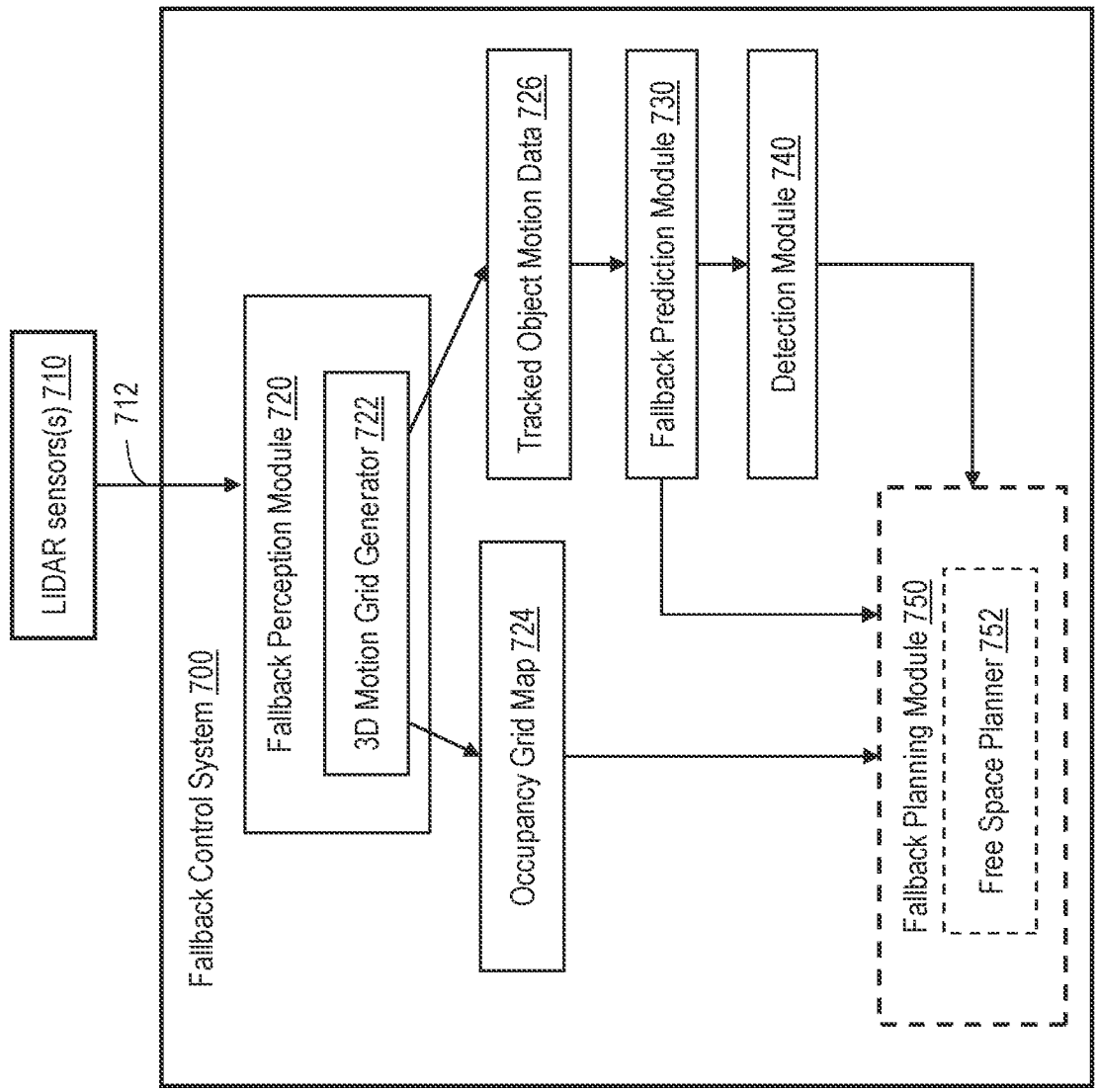
FIG. 7 is a block diagram illustrating an exemplary fallback control system that implements three-dimensional (3D) motion grid information generation for imminent collision detection, according to some embodiments of the present disclosure.

FIG. 7 is a block diagram illustrating an exemplary fallback control system 700 that implements 3D motion grid information generation for imminent collision detection, according to some embodiments of the present disclosure. The fallback control system 700 may be included by an AV such as the AV 10 of FIG. 1 or the AV 402 of FIGS. 4 and 5 for imminent collision detection. In some aspects, the AV control system 200 of FIG. 2 may include the fallback control system 700 in place of the fallback control system 230. In some aspects, the AV control system 300 of FIG. 3 may include the fallback control system 700 in place of the fallback control system 330.

As shown, the fallback control system 700 may include a fallback perception module 720, a fallback prediction module 730, a detection module 740 and a fallback planning module 750. The fallback perception module 720 may be similar to the fallback perception module 232 in many respects. For instance, the fallback perception module 720 may determine a perception of a surrounding environment of the AV, for example, based on LIDAR data 712 collected from LIDAR sensor(s) 710 (e.g., the LIDAR sensors 212*b*) of the AV. In some instances, the LIDAR sensor(s) 710 may be installed at a roof top of the AV. Additionally, the fallback perception module 720 may perform 3D motion grid generation to provide real-time motion information so that the fallback control system 700 can determine a response or action for the AV quickly.

In some aspects, the fallback perception module 720 may include a 3D motion grid generator 722. The 3D motion grid generator 722 may partition a 3D space (outside of the AV) captured by the LIDAR data 712 (e.g., 3D point clouds) into grids or cells. The LIDAR sensor(s) 710 may perform captures repeatedly, for example, according to a scan frequency configured at the LIDAR sensor(s) 710, and thus may feed LIDAR data 712 to the 3D motion grid generator 722 repeatedly. The 3D motion grid generator 722 may analyze measurements provided by the LIDAR data 712 from one time instant to another time instant and over a duration of time to determine whether each grid in the 3D space is occupied, free, or unknown. An occupied space may refer to an area or space that are occupied by object(s) (e.g., vehicles, people, buildings, trees, etc.). A free space may refer to an area or space in which no object is present. An unknown space may refer to an area or space in which the 3D motion grid generator 722 may fail to conclude whether it is free or occupied. The 3D motion grid generator 722 may generate an occupancy grid map 724 including a plurality of grids corresponding to spaces, areas, and/or cells the 3D space. The occupancy grid map 724 may include an indication for each grid of the plurality of grids indicating whether the respective grid is an occupied space, a free space, or an unknown space (e.g., as shown in the occupancy grid maps 800 and 810 of FIG. 8).

Further, the 3D motion grid generator 722 may identify objects in the 3D space that are moving based on the LIDAR data 712 captured at different time instants over a duration (e.g., a temporal window). Accordingly, the 3D motion grid generator 722 may track the moving objects and determine motion information associated with the tracked objects. The motion information can include estimates of the position, velocity, acceleration, and/or size (e.g., length/width) associated with the tracked object(s). The 3D motion grid generator 722 may generate tracked object motion data 726 including indications of the tracked objects and associated motion information. The tracked object motion data 726 can be provided to the fallback prediction module 730, which may then predict trajectories of objects in the AV's vicinity using the tracked object motion data 726.

The detection module 740 may be substantially similar to the detection module 338 as discussed above with reference to FIGS. 3 and 7. For instance, the detection module 740 may monitor for an imminent collision between the AV and an object in an environment of the AV based on path information received from a respective primary control system (e.g., the primary control system 320 and/or 720). The detection module 740 may perform the monitoring and/or detection based on predicted trajectories provided by the fallback prediction module 730. In some aspects, the detection module 740 may indicate to the respective primary control system upon detecting an imminent collision involving the AV (e.g., as discussed above with reference to FIG. 3).

In some aspects, the fallback planning module 750 may optionally plan a path for the AV using the occupancy grid map 724 output by the 3D motion grid generator 722, the predictions (e.g., predicted trajectories of the tracked objects) output by the fallback prediction module 730, and/or imminent collision detection information provided by the detection module 740. In some aspects, the fallback planning module 750 may include a free space planner 752. The free space planner 752 may compute a collision-free path for the AV to maneuver based on free space(s) indicated by the occupancy grid map 724. As an example, the free space planner 752 may compute a path that traverses through free space(s) avoiding any occupied area, unknown area, and/or obstacles on the roads. The free space planner 752 may compute the path without considering any lane limitation (e.g., without avoiding driving in a bike lane or travel within a traffic lane, etc.). In some aspects, the fallback planning module 750 may provide information about the computed path to a command controller of the AV, and the command controller may select between generating a command for controlling the AV based on the path information from the fallback control system 700 or based on path information from the respective primary control system as discussed above.

Figure 8:
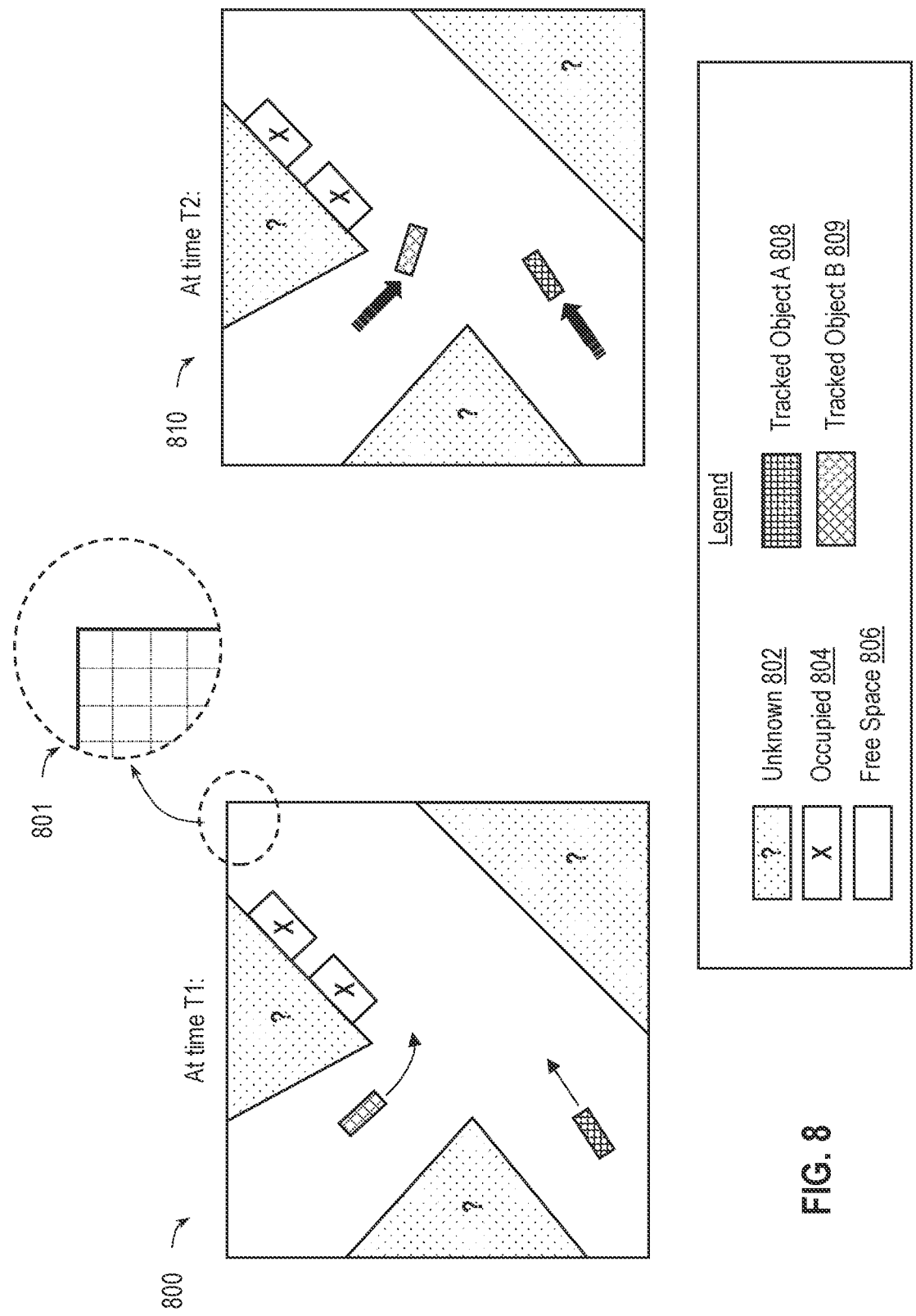
FIG. 8 illustrates exemplary occupancy grid maps, according to some embodiments of the present disclosure.

FIG. 8 illustrates exemplary occupancy grid maps 800 and 810, according to some embodiments of the present disclosure. For instance, the occupancy grid maps 800 and 810 may be generated by the 3D motion grid generator 722 of FIG. 7. The occupancy grid maps 800 and 810 may represent about the same geographical area around the AV. The occupancy grid map 800 may be generated based on LIDAR data 712 captured at time T1, and the occupancy grid map 800 may be generated based on new LIDAR data 712 captured at time T2. In general, the 3D motion grid generator 722 can generate occupancy grid maps at any suitable rate (e.g., according to the scan frequency of the LIDAR sensor(s) 710 or at a slower rate). For simplicity of illustration, the grid lines for the occupancy grid maps 800 and 810 are not shown.

For simplicity of illustration, grid lines are only shown for an expanded view 801 of a portion of the occupancy grid map 810. However, in general, the occupancy grid maps 800 and/or 810 may be partitioned into grids of any suitable granularity (e.g., with uniform grid size or nonuniform grid size) and may include an indication for each grid indicating whether the respective grid is an occupied space, a free space, or an unknown space. As shown, the occupancy grid map 800 (for time T1) includes indications of free spaces 806 (shown by empty filled shapes), occupied spaces 804 (shown by the symbols "X"), and unknown spaces 802 (shown by the symbols "?"). Further, the occupancy grid map 800 may include indications of tracked objects (moving objects), for example, a tracked object A 808 and a tracked object B 809 with respective arrows. The occupancy grid map 810 (for time T2) may be substantially similar to the occupancy grid map 800. As shown, the occupancy grid map 800 may include indications of free spaces 806, occupied spaces 804, and unknown spaces 802. Additionally, the occupancy grid map 810 may also include indications of the tracked object A 808 and the tracked object B 809 moved to new locations compared to the occupancy grid map 800 as shown by the arrows. For instance, the 3D motion grid generator 722 may determine motion information (e.g., including position, velocity, acceleration, and/or size) for the tracked object A 808 and B 809 based on the LIDAR data received at time T1 and at time T2 and output the motion information as part of the tracked object motion data 726.

Example processes for operating an AV with fallback controls

Figure 9:
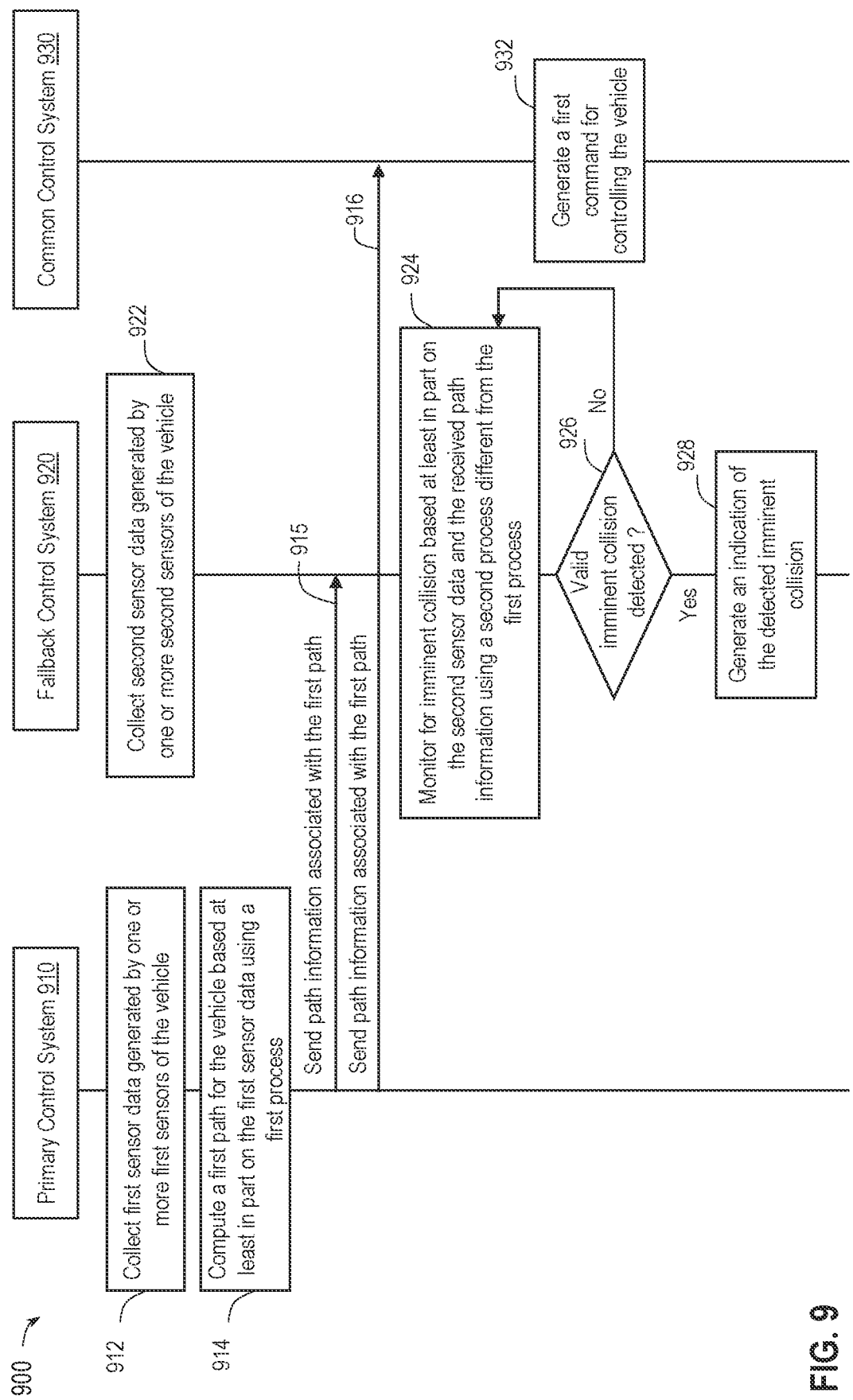
FIG. 9 is a sequence diagram illustrating a process for operating an AV with imminent collision detection, according to some embodiments of the present disclosure.

FIG. 9 is a sequence diagram illustrating a process 900 for operating an AV with imminent collision detection, according to some embodiments of the present disclosure. The process 900 may be implemented between a primary control system 910, a fallback control system 920, and a common control system 930. The primary control system 910, the fallback control system 920, and the common control system 930 may be included at a vehicle (e.g., the AV 10 of FIG. 1 and/or the AV 402 of FIGS. 4-5) for controlling the vehicle. In some aspects, the primary control system 910, the fallback control system 920, and the common control system 930 may correspond to the primary control system 320, the fallback control system 330, and the command controller of FIG. 3, respectively. In some aspects, the fallback control system 920 may include 3D motion grid generation as discussed above with reference to FIGS. 7 and 8. The process 900 may utilize similar mechanisms discussed above with reference to FIGS. 1-9. Operations are illustrated once each and in a particular order in FIG. 9, but the operations may be performed in parallel, reordered, and/or repeated as desired. For instance, the primary control system 910 may perform at least the operations at 912 and 914 in parallel with the fallback control system 920 performing the operations at 922 and 924.

At 912, the primary control system 910 may collect first sensor data (e.g., the first portion 301 of the sensor data 302) generated by one or more first sensors of the vehicle. The one or more first sensors may be similar to the sensors in the sensor system 28 of FIG. 1 or in the sensor suite 210 of FIG. 2.

At 914, the primary control system 910 may compute a first path for the vehicle based at least in part on the first sensor data using a first process (or algorithm(s)). The first process can include determining a first perception of an environment surrounding the vehicle based on the first sensor data and determining a first prediction of trajectories of the vehicle and/or other traffic participants in the environment based on the first perception, for example, as discussed above with reference to FIGS. 1-6.

At 915, the primary control system 910 may transmit, and the fallback control system 920 may receive, path information associated with the first path. For example, a detection module similar to the detection module 338 of the fallback control system 920 may receive the path information.

At 916, the primary control system 910 may transmit, and the common control system 930 may receive, the path information associated with the first path.

At 932, the common control system 930 may generate a first command for controlling the vehicle according to the path information received at 916.

At 922, the fallback control system 920 may collect second sensor data (e.g., the second portion 303 of the sensor data 302) generated by one or more second sensors of the vehicle. The one or more second sensors may be similar to the sensors in the sensor system 28 of FIG. 1 or in the sensor suite 210 of FIG. 2. In some aspects, the second sensor data may be a subset of the first sensor data collected by the primary control system 910 at 912 and the subset may be less than all of the first sensor data. That is, the one or more second sensors may be a subset of the one or more first sensors. For instance, the one or more first sensors may include cameras and LIDAR sensors on the vehicle, and the one or more second sensors may correspond to the LIDAR sensors. As such, the first sensor data may include image data from the cameras and point clouds from the LIDAR sensors, whereas the second sensor data may include the point clouds (LIDAR data) but not the image data. In other aspects, the one or more second sensors may be separate from the one or more first sensors (e.g., for example, to provide sensor hardware redundancy). For instance, the one or more first sensors may include cameras and LIDAR sensors on the vehicle, and the one or more second sensors may include other LIDAR sensors on the vehicle. Thus, the second sensor data may be separate from the first sensor data. In some examples, all of the one or more second sensors are LIDAR sensors.

At 924, the fallback control system 920 may monitor for an imminent collision between the vehicle and an object in an environment outside of the vehicle based at least in part on the second sensor data and the path information received at 915 using a second process different from the first process. The second process can include determining a second perception of the environment based on the second sensor data and determining a second prediction of trajectories of the vehicle and/or other traffic participants in the environment based on the perception, for example, as discussed above with reference to FIGS. 1-8. In some aspects, the second process may be based on heuristic-based algorithms (e.g., linear extrapolation techniques) while the first process used by the primary control system 910 for perception and/or prediction at 914 may be based on machine learning algorithms. In some aspects, the fallback control system 920 may predict trajectories further based on various augmentations (e.g., aligning trajectories to lanes based on map data, adjusting a predicted trajectory of an object based on the object type). In some aspects, the fallback control system 920 may generate 3D motion grid information (e.g., the occupancy grid maps 724, 800, and/or 810 and the tracked object motion data 726) and predict trajectories of object(s) in an environment of the vehicle based on the 3D motion grid information as discussed above with reference to FIGS. 7-8.

At 926, the fallback control system 920 may determine whether a valid imminent collision is detected. For instance, the fallback control system 920 may determine that a valid imminent collision is detected if a number of consecutive imminent collisions between the vehicle and the object detected satisfies a threshold as discussed above with reference to FIG. 6. Additionally or alternatively, the fallback control system 920 may determine whether a detected imminent collision is valid or not by taking traffic rules into consideration and assuming that traffic participants may be observant of traffic rules. As an example, the fallback control system 920 may detect that an imminent collision may occur between the vehicle and another vehicle coming out of a parking lot and cutting across a lane in which the vehicle is traveling. The fallback control system 920 may assume that the other vehicle may correct itself and drive within a lane, and thus the fallback control system 920 may invalidate the detected imminent collision and suppress an imminent collision trigger to the primary control system 910. As another example, the fallback control system 920 may detect that an imminent collision may occur between the vehicle and another vehicle making a bad turn, cutting across a center line of the road in which the vehicle is traveling. The fallback control system 920 may assume that the other vehicle may correct itself and drive within a lane, and thus the fallback control system 920 may invalidate the detected imminent collision and suppress an imminent collision trigger to the primary control system 910.

At 928, upon detecting the valid imminent collision, the fallback control system 920 may generate an indication of the detected imminent collision. In some instances, the fallback control system 920 may transmit an indication of the detected, validated imminent collision to other modules or subsystems of the vehicle for handling. If, however, the fallback control system 920 fails to detect a valid imminent collision at 926, the fallback control system 920 may repeat the monitoring at 924, for example, as discussed above with reference to FIG. 6.

Example Computing System

Figure 10:
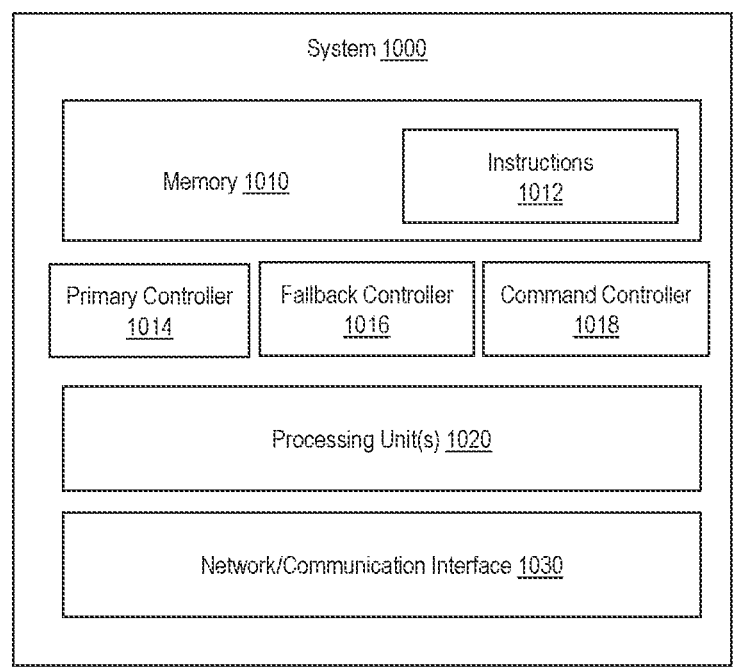
FIG. 10 illustrates an exemplary computing system used in various embodiments of the present disclosure.

FIG. 10 illustrates components of a computing system 1000 used in implementations described herein. In some embodiments, the components of FIG. 10 can be present in a vehicle or an AV (e.g., the AV 10 of FIG. 1, the AV 402 of FIGS. 4-5). In other embodiments, the components of FIG. 10 can be present in an infrastructure system for AV.

Referring to FIG. 10, system 1000 can be implemented within one computing device or distributed across multiple computing devices or subsystems that cooperate in executing program instructions. In some implementations, the system 1000 can include one or more blade server devices, standalone server devices, personal computers, routers, hubs, switches, bridges, firewall devices, intrusion detection devices, mainframe computers, network-attached storage devices, smartphones and other mobile telephones, and other computing devices. The system hardware can be configured according to any suitable computer architectures such as a Symmetric Multi-Processing (SMP) architecture or a Non-uniform Memory Access (NUMA) architecture.

The system 1000 can include one or more processing units 1020, which can include one or more hardware processors and/or other circuitry that retrieves and executes instructions 1012 (e.g., software or firmware codes) from memory 1010. The one or more processing units 1020 can be implemented within one processing device, chip, or package and can also be distributed across multiple processing devices, chips, packages, or subsystems that cooperate in executing program instructions. In one implementation, the one or more processing units 1020 may include a CPU and a GPU. The GPU can execute the visual/image processing in the computing system. The GPU, or any second-order processing element independent from CPU dedicated to processing imagery and other perception data in real or near real-time, can provide a significant benefit.

The memory 1010 can include any computer-readable storage media readable by one or more processing unit(s) 1020 and that stores instructions 1012. The memory 1010 can be implemented as one storage device and can also be implemented across multiple co-located or distributed storage devices or subsystems. The memory 1010 can include additional elements, such as a controller, that communicate with the one or more processing units 1020. The memory 1010 can also include storage devices and/or subsystems on which data and/or instructions may be stored. System 1000 can access one or more storage resources to access information to carry out any of the processes indicated by instructions 1012.

The instructions 1012, including routines for at least partially performing at least one of the processes illustrated in FIGS. 1-10, can be implemented in program instructions. Further, the instructions 1012, when executed by system 1000 in general or the one or more processing unit(s) 1020 in particular, can direct, among other functions, the system 1000 or the one or more processing units 1020 to operate as described herein.

In some embodiments, the system 1000 may further include a primary controller 1014, a fallback controller 1016, and a command controller 1018, for example, when the system 1000 is part of an AV such as the AV 10 of FIG. 1 or the AV 402 of FIGS. 4-5. Each of the primary controller 1014, fallback controller 1016, and command controller 1018 can include hardware and/or software components. In some examples, the primary controller 1014, the fallback controller 1016, and/or the command controller 1018 can be implemented as part of the one or more processing unit(s) 1020. The primary controller 1014 may implement operations of a primary control system (e.g., the primary control system 220 of FIG. 2, the primary control system 320 of FIG. 3, the primary control system 910 of FIG. 9), for example, to compute paths and/or update paths, as discussed herein. The fallback controller 1016 may implement operations of a fallback control system (e.g., the fallback control system 230 of FIG. 2, the fallback control system 330 of FIG. 3, the fallback control system 700 of FIG. 7, the fallback control system 920 of FIG. 9), for example, to perform imminent collision monitoring and detection, as discussed herein. The command controller 1018 may implement operations of a common control system (e.g., the common control system 240 of FIG. 2), for example, to generate commands for controlling the AV, as discussed herein.

In implementations where the system 1000 may include multiple computing devices, the server can use one or more communications networks that facilitate communication among the computing devices. For example, the one or more communications networks can include or be a local or wide area network that facilitates communication among the computing devices. One or more direct communication links can be included between the computing devices. In addition, the computing devices can be installed at geographically distributed locations or at one geographic location, such as a server farm or an office.

System 1000 can include a communications interface 1030 that provides one or more communication connections and/or one or more devices that allow for communication between system 1000 and other computing systems (not shown) over a communication network or collection of networks (not shown) or the air.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Selected Examples

Example 1 includes a method including collecting sensor data generated by one or more sensors of a vehicle; detecting, by a fallback control system of a vehicle based on the sensor data, an imminent collision between the vehicle and an object in an environment of the vehicle using a first process different from a second process of a primary control system of the vehicle, where the first process and the second process are associated with at least one of a perception or a prediction; and transmitting, by the fallback control system to the primary control system, an indication of the detected imminent collision.

In Example 2, the method of Example 1 can optionally include receiving, by the fallback control system from the primary control system, path information associated with a path for the vehicle, where the detecting the imminent collision between the vehicle and the object is further based on the path information.

In Example 3, the method of any of Examples 1-2 can optionally include where the detecting the imminent collision is performed repeatedly; and the transmitting the indication of the detected imminent collision is further based on a number of consecutive detected imminent collisions satisfying a threshold.

In Example 4, the method of any of Examples 1-3 can optionally include adjusting the threshold for determining whether to transmit the indication of the detected imminent collision based on an object type of the object.

In Example 5, the method of any of Examples 1-4 can optionally include where the transmitting the indication of the detected imminent collision is further based on a timer associated with the detected imminent collision.

In Example 6, the method of any of Examples 1-5 can optionally include adjusting a duration of the timer associated with the detected imminent collision based on an object type of the object.

In Example 7, the method of any of Examples 1-6 can optionally include where the first process used by the fallback control system to detect the imminent collision is based on rules, and where the second process of the primary control system is based on machine learning.

In Example 8, the method of any of Examples 1-7 can optionally include where the detecting the imminent collision includes predicting at least one of a trajectory of the vehicle or a trajectory of the object using a heuristic-based prediction.

In Example 9, the method of any of Examples 1-8 can optionally include where the detecting the imminent collision includes predicting at least one of a trajectory of the vehicle or a trajectory of the object using a linear extrapolation technique.

In Example 10, the method of any of Examples 1-9 can optionally include where the detecting the imminent collision includes predicting at least one of a first trajectory of the vehicle or a second trajectory of the object based on map information.

In Example 11, the method of any of Examples 1-10 can optionally include where the detecting the imminent collision includes predicting at least one of a first trajectory of the vehicle or a second trajectory of the object based on an alignment between one or more lanes and the at least one of the first trajectory or the second trajectory.

In Example 12, the method of any of Examples 1-11 can optionally include where the detecting the imminent collision includes predicting a trajectory of the object based on the sensor data; and adjusting the trajectory based on an object type of the object.

In Example 13, the method of any of Examples 1-12 can optionally include further including predicting a trajectory of the vehicle and a trajectory of a second object in the environment of the vehicle is at least partially overlapping; and suppressing a trigger for an imminent collision between the vehicle and the second object based on an assumption that the second object is observant of a traffic rule.

In Example 14, the method of any of Examples 1-13 can optionally include where the detecting the imminent collision includes processing the sensor data to generate motion information associated with at least the object that participates in the detected imminent collision; and computing a trajectory of the object based on the motion information.

In Example 15, the method of any of Examples 1-14 can optionally include where the processing the sensor data to generate the motion information includes processing the sensor data to generate a series of occupancy grid maps associated with a time window, each including a plurality of grids and an indication of whether a respective grid is occupied, free, or unknown; and generating the motion information based on the series of occupancy grid maps.

Example 16 includes a method implemented by a vehicle, the method including collecting sensor data generated by one or more sensors of the vehicle; computing, based on the sensor data, a first path for the vehicle using a first process; and computing an update for the first path to generate a second path responsive to an indication of an imminent collision detected between the vehicle and an object in an environment of the vehicle, where the detected imminent collision is based on a second process different from the first process, and where the first process and the second process are associated with at least one of a perception or a prediction.

In Example 17, the method of Example 16 can optionally include transmitting, by a primary control system of the vehicle to a fallback control system of the vehicle, information associated with the first path, where the receiving the indication of the detected imminent collision includes receiving, by the primary control system from the fallback control system, the indication of the detected imminent collision.

In Example 18, the method of any of Examples 16-17 can optionally include monitoring for the imminent collision using the second process.

In Example 19, the method of any of Examples 16-18 can optionally include where the indication of the imminent collision is based on a number of consecutive detected imminent collisions satisfying a threshold.

In Example 20, the method of any of Examples 16-19 can optionally include where the first process used by the primary control system to determine the path is based on machine learning, and where the second process for detecting the imminent collision is based on rules.

In Example 21, the method of any of Examples 16-20 can optionally include where the computing the path for the vehicle is based on a first prediction over a first time window; and the computing the update for the path is further based on a second prediction over a second time window shorter than the first time window.

In Example 22, the method of any of Examples 16-21 can optionally include transmitting, by the primary control system, an indication of the determined path, where the receiving the indication of the detected imminent collision is in response to the transmitting.

In Example 23, the method of any of Examples 16-22 can optionally include where the transmitting includes transmitting, by the primary control system to a fallback control system, information associated with the path determined for the vehicle; and the receiving includes receiving, by the primary control system from the fallback control system, the indication of the detected imminent collision.

Example 24 includes a vehicle including a primary control system to compute a first path for the vehicle based at least in part on first sensor data; and compute, responsive to a detected collision detection, an update for the first path to generate a second path; a fallback control system to monitor, based at least in part on second sensor data, for an imminent collision between the vehicle and an object in an environment outside of the vehicle, where the monitoring includes determining at least one of a first perception or a first prediction independent of the primary control system; and detect, based on the monitoring, the imminent collision.

In Example 25, the vehicle of Example 24 can optionally include where the fallback control system monitors for the imminent collision repeated according to a predetermined time interval.

In Example 26, the vehicle of any of Examples 24-25 can optionally include where the fallback control system determines that the imminent collision is detected further based on a number of imminent collisions detected between the vehicle and the object from the monitoring satisfies a threshold.

In Example 27, the vehicle of any of Examples 24-26 can optionally include where the primary control system determines the first path by processing the first sensor data using a machine learning model to determine at least one of a second perception or a second prediction; and the fallback control system determines the at least one of the first perception or the first prediction using one or more heuristic rules.

In Example 28, the vehicle of any of Examples 24-27 can optionally include where the fallback control system further predicts a trajectory of the vehicle and a trajectory of another object in the environment of the vehicle is at least partially overlapping; and suppress a trigger for an imminent collision between the vehicle and the other object based at least in part on an assumption that the other object is observant of a traffic rule.

In Example 29, the vehicle of any of Examples 24-28 can optionally include where the fallback control system detects the imminent collision by processing the second sensor data to generate motion information associated with at least the object that participates in the detected imminent collision; and computing a trajectory of the object based on the motion information.

In Example 30, the vehicle of any of Examples 24-29 can optionally include where the fallback control system processes the sensor data to generate the motion information by processing the second sensor data to generate a series of occupancy grid maps associated with a time window, each including a plurality of grids and an indication of whether a respective grid is occupied, free, or unknown; and generating the motion information based on the series of occupancy grid maps.

In Example 31, the vehicle of any of Examples 24-30 can optionally include a command controller to generate a first command for controlling the vehicle based on the first path; and generate a second command for controlling the vehicle based on the second path.

Variations and Implementations

As will be appreciated by one skilled in the art, aspects of the present disclosure, in particular, aspects of using the generator model to add elements to and/or modify elements in a scene and using the discriminator model to classify an object from a scene, described herein, can be embodied in various manners (e.g., as a method, a system, a computer program product, or a computer-readable storage medium). Accordingly, aspects of the present disclosure can take the form of a hardware implementation, a software implementation (including firmware, resident software, or microcode) or an implementation combining software and hardware aspects that can generally be referred to herein as a "circuit," "module" or "system." Functions described in this disclosure can be implemented as an algorithm executed by one or more hardware processing units, e.g. one or more microprocessors of one or more computers. In various embodiments, different steps and portions of the operations of the methods described herein can be performed by different processing units. Furthermore, aspects of the present disclosure can take the form of a computer program product embodied in one or more computer-readable media having computer-readable program code embodied, e.g., stored or encoded, thereon. In various embodiments, such a computer program can, for example, be downloaded (or updated) to the existing devices and systems or be stored upon manufacturing of these devices and systems.

The foregoing disclosure presents various descriptions of certain specific embodiments. The innovations described herein can be embodied in a multitude of different ways, for example, as defined and covered by the claims and/or select examples. In the following description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some embodiments can incorporate any suitable combination of features from two or more drawings.

The foregoing disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. Numerous implementation-specific decisions might be made to achieve the developer's specific goals, including compliance with system, business, and/or legal constraints, which may vary from one implementation to another. Additionally, while such a development effort might be complex and time-consuming; it would be a routine undertaking for those of ordinary skill in the art having the benefit of this disclosure.

In the Specification, reference might be made to spatial relationships between various components and to the spatial orientation of various aspects of components as depicted in the attached drawings. As will be recognized by those skilled in the art after a complete reading of the present disclosure, the devices, components, members, and apparatuses described herein can be positioned in any orientation. Thus, the use of terms such as "above", "below", "upper", "lower", "top", "bottom", or other similar terms to describe a spatial relationship between various components or to describe the spatial orientation of aspects of such components, describe a relative relationship between the components or a spatial orientation of aspects of such components, respectively, as the components described herein can be oriented in any direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

In addition, the terms "storage media," "computer-readable storage media," or "computer-readable storage medium" can refer to non-transitory storage media, such as a hard drive, a memory chip, and cache memory, and to transitory storage media, such as carrier waves or propagating signals.

Further, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

In one example embodiment, any number of electrical circuits of the FIGS. can be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.) and computer-readable, non-transitory memory elements can be coupled to the board based on particular configurations, processing demands, or computer designs. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have been offered for purposes of example and teaching. Such information can be varied considerably, as the specifications apply to non-limiting examples. In the foregoing description, example implementations have been described with reference to particular arrangements of components. Various modifications and changes can be made to such implementations. The description and drawings are, accordingly, to be regarded in an illustrative sense and not in a restrictive sense.

With the numerous examples provided herein, interaction may be described in terms of two, three, four, or more electrical components for purposes of clarity and example. The system can be consolidated in any suitable manner. Along similar design alternatives, any of the illustrated components, modules, and elements of the FIGS. can be combined in various possible configurations within the scope of this disclosure. In certain cases, it might be easier to describe one or more of the functionalities of a given set of flows by referencing a limited number of electrical elements. The electrical circuits of the FIGS. and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

Note that in this Specification, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might not necessarily be combined in the same embodiments.

Note that the functions related to using the generator model to add elements to and/or modify elements in a scene and using the discriminator model to classify an object from a scene, e.g. those summarized in the one or more processes shown in FIGS., illustrate some of the possible functions that can be executed by, or within, the systems illustrated in the FIGS. Some of these operations can be deleted or omitted where appropriate, or these operations can be modified or changed considerably. In addition, the timing of these operations can be altered considerably. The preceding operational flows have been offered for purposes of example and discussion. Implementations described herein provide flexibility, in that any suitable arrangements, chronologies, configurations, and timing mechanisms can be provided.

Numerous other changes, substitutions, variations, alterations, and modifications might be ascertained by one skilled in the art, and the present disclosure encompasses such changes, substitutions, variations, alterations, and modifications as falling within the scope of the appended claims. Optional features of the apparatus described above can be implemented with respect to the method or process described herein and specifics in the examples can be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
   collecting sensor data generated by one or more sensors of a vehicle;
   detecting, by a fallback control system of the vehicle based on the sensor data, an imminent collision between the vehicle and an object in an environment of the vehicle using a first process different from a second process of a primary control system of the vehicle,
   wherein the detecting of the imminent collision is performed repeatedly,
   wherein the first process and the second process are associated with at least one of a perception or a prediction,
   wherein the first process includes: predicting a trajectory of the vehicle and a trajectory of the object in the environment of the vehicle is at least partially overlapping, and
   classifying the object to determine an object type of the object,
   determining, by the fallback control system and based on the object type of the object, whether to suppress a trigger, which indicates the detected imminent collision, from being transmitted to the primary control system;
   suppressing transmission of the trigger when the object type of the object corresponds to an assumption that the object is observant of a traffic rule that would result in avoidance of the detected imminent collision between the vehicle and the object;
   transmitting, by the fallback control system to the primary control system, the trigger when the object type of the object does not correspond to the assumption that the object is observant of the traffic rule that would result in avoidance of the detected imminent collision between the vehicle and the object;
   wherein the transmitting of the trigger is further based on a number of consecutive detected imminent collisions satisfying a threshold number of consecutive detections;
   adjusting the threshold number of consecutive detections for determining whether to transmit the trigger based on the object type of the object; and
   determining, by the primary control system based on the sensor data, using the second process a path for the vehicle in the environment, wherein the second process utilizes machine learning to determine the path, and
   wherein the primary control system and the fallback control system operate within a multi-layer autonomous vehicle software stack that autonomously controls operation of the vehicle.

2. The method of claim 1,
   wherein the detecting the imminent collision between the vehicle and the object is further based on the path information.

3. The method of claim 1, wherein the transmitting the indication of the detected imminent collision is further based on a timer associated with the detected imminent collision.

4. The method of claim 1, wherein the first process used by the fallback control system to detect the imminent collision is based on heuristic rules.

5. The method of claim 1, wherein the detecting the imminent collision comprises:
   predicting a trajectory of the object based on the sensor data; and adjusting the trajectory based on the object type of the object.

6. The method of claim 1, wherein the detecting the imminent collision comprises:
processing the sensor data to generate motion information associated with at least the object that participates in the detected imminent collision; and
computing a trajectory of the object based on the motion information.

7. The method of claim 6, wherein the processing the sensor data to generate the motion information comprises:
processing the sensor data to generate a series of occupancy grid maps associated with a time window, each including a plurality of grids and an indication of whether a respective grid is occupied, free, or unknown; and
generating the motion information based on the series of occupancy grid maps.

8. One or more non-transitory, computer-readable media encoded with instructions that, when executed by one or more processing units of a vehicle, perform a method comprising:
receiving, by a fallback control system from a primary control system, path information associated with a path for the vehicle, the path based on at least one of a first perception or a first prediction from the primary control system;
collecting sensor data generated by one or more sensors of a vehicle;
detecting, by the fallback control system of the vehicle, based on the sensor data and the received path information, an imminent collision between the vehicle and an object in an environment of the vehicle using at least one of a second perception different from the first perception or a second prediction different from the first prediction,
wherein the detecting of the imminent collision is performed repeatedly,
wherein the second perception or the second prediction includes: predicting a trajectory of the vehicle and a trajectory of the object in the environment of the vehicle is at least partially overlapping, and
classifying the object to determine an object type of the object,
determining, by the fallback control system and based on the object type of the object, whether to suppress a trigger, which indicates the detected imminent collision, from being transmitted to the primary control system;
suppressing transmission of the trigger when the object type of the object corresponds to an assumption that the object is observant of a traffic rule that would result in avoidance of the detected imminent collision between the vehicle and the object;
transmitting to the primary control system the trigger when the object type of the object does not correspond to the assumption that the object is observant of the traffic rule that would result in avoidance of the detected imminent collision between the vehicle and the object;
wherein the transmitting of the trigger is further based on a number of consecutive detected imminent collisions satisfying a threshold number of consecutive detections;
adjusting the threshold number of consecutive detections for determining whether to transmit the trigger based on the object type of the object; and determining, by the primary control system based on the sensor data, using machine learning, a path for the vehicle in the environment, and
wherein the primary control system and the fallback control system operate within a multi-layer autonomous vehicle software stack that autonomously controls operation of the vehicle.

9. The one or more non-transitory, computer-readable media of claim 8, wherein:
the at least one of the first perception or the first prediction on which the path is based includes machine learning; and
the at least one of the second perception or the second prediction for detecting the imminent collision is based on rules.

10. The one or more non-transitory, computer-readable media of claim 8, wherein:
the detecting the imminent collision is performed repeatedly; and
the transmitting the indication of the detected imminent collision is further based on a number of consecutive detected imminent collisions satisfying a threshold.

11. A vehicle comprising:
a hardware processor; and
a set of memory units coupled to the hardware processor, which includes instructions that when performed by the processor cause the vehicle to:
collect sensor data generated by one or more sensors of a vehicle;
detect, by a fallback control system of the vehicle based on the sensor data, an imminent collision between the vehicle and an object in an environment of the vehicle using a first process different from a second process of a primary control system of the vehicle,
wherein the detecting of the imminent collision is performed repeatedly,
wherein the first process and the second process are associated with at least one of a perception or a prediction,
wherein the first process includes: predict a trajectory of the vehicle and a trajectory of the object in the environment of the vehicle is at least partially overlapping, and
classifying the object to determine an object type of the object,
determine, by the fallback control system and based on the object type of the object, whether to suppress a trigger, which indicates the detected imminent collision, from being transmitted to the primary control system;
suppress transmission of the trigger when the object type of the object corresponds to an assumption that the object is observant of a traffic rule that would result in avoidance of the detected imminent collision between the vehicle and the object;
transmit, by the fallback control system to the primary control system, the trigger when the object type of the object does not correspond to the assumption that the object is observant of the traffic rule that would result in avoidance of the detected imminent collision between the vehicle and the object;
wherein the transmitting of the trigger is further based on a number of consecutive detected imminent collisions satisfying a threshold number of consecutive detections;

adjust the threshold number of consecutive detections for determining whether to transmit the trigger based on the object type of the object; and determine, by the primary control system based on the sensor data, using the second process a path for the vehicle in the environment, wherein the second process utilizes machine learning to determine the path, and wherein the primary control system and the fallback control system operate within a multi-layer autonomous vehicle software stack that autonomously controls operation of the vehicle.

12. The vehicle of claim 11, wherein the detecting the imminent collision between the vehicle and the object is further based on the path information.

13. The vehicle of claim 11, wherein the transmitting the indication of the detected imminent collision is further based on a timer associated with the detected imminent collision.

14. The vehicle of claim 11, wherein the detecting the imminent collision comprises:

predicting a trajectory of the object based on the sensor data; and adjusting the trajectory based on the object type of the object.

15. The vehicle of claim 11, wherein the detecting the imminent collision comprises:

processing the sensor data to generate motion information associated with at least the object that participates in the detected imminent collision; and computing a trajectory of the object based on the motion information.

16. The vehicle of claim 11, wherein the processing the sensor data to generate the motion information comprises:

processing the sensor data to generate a series of occupancy grid maps associated with a time window, each including a plurality of grids and an indication of whether a respective grid is occupied, free, or unknown; and generating the motion information based on the series of occupancy grid maps.

* * * * *